US011996093B2

(12) United States Patent
Kawano et al.

(10) Patent No.: US 11,996,093 B2
(45) Date of Patent: May 28, 2024

(54) INFORMATION PROCESSING APPARATUS AND INFORMATION PROCESSING METHOD

(71) Applicant: SONY CORPORATION, Tokyo (JP)

(72) Inventors: Shinichi Kawano, Tokyo (JP); Hiro Iwase, Kanagawa (JP); Mari Saito, Kanagawa (JP); Yuhei Taki, Kanagawa (JP)

(73) Assignee: SONY CORPORATION

( * ) Notice: Subject to any disclaimer, the term of this patent is extended or adjusted under 35 U.S.C. 154(b) by 180 days.

(21) Appl. No.: 16/650,030

(22) PCT Filed: Jul. 12, 2018

(86) PCT No.: PCT/JP2018/026381
§ 371 (c)(1),
(2) Date: Mar. 24, 2020

(87) PCT Pub. No.: WO2019/069529
PCT Pub. Date: Apr. 11, 2019

(65) Prior Publication Data
US 2020/0279559 A1    Sep. 3, 2020

(30) Foreign Application Priority Data
Oct. 2, 2017   (JP) ................................ 2017-192362

(51) Int. Cl.
*G10L 15/22* (2006.01)
*G10L 13/00* (2006.01)
(Continued)

(52) U.S. Cl.
CPC .............. *G10L 15/22* (2013.01); *G10L 13/00* (2013.01); *G10L 13/033* (2013.01); *G10L 25/78* (2013.01); *G10L 2015/223* (2013.01)

(58) Field of Classification Search
None
See application file for complete search history.

(56) References Cited

U.S. PATENT DOCUMENTS 10,817,316 B1 * 10/2020 Young ............... G06F 16/24575
2013/0278492 A1 * 10/2013 Stolarz .................. G06F 16/242
345/156

(Continued)

FOREIGN PATENT DOCUMENTS

CN          107430501 A      12/2017
EP          2824540 A1 *   1/2015 .............. G06F 3/011
(Continued)

OTHER PUBLICATIONS

International Search Report and Written Opinion of PCT Application No. PCT/JP2018/026381, dated Oct. 9, 2018, 07 pages of ISRWO.

*Primary Examiner* — Andrew C Flanders
*Assistant Examiner* — Jonathan Ernesto Amaya Hernandez
(74) *Attorney, Agent, or Firm* — CHIP LAW GROUP

(57) ABSTRACT

An information processing apparatus and an information processing method are provided that enable suitable determination of sensing results used in estimating a user state. The information processing apparatus is provided with a determination unit that determines, on the basis of a predetermined reference, one or more second sensing results used in estimating the user state from among a plurality of first sensing results received from a plurality of devices. The information processing apparatus is further provided with an output control unit that controls an output of information on the basis of the one or more second sensing results.

18 Claims, 29 Drawing Sheets

(51) Int. Cl.
*G10L 13/033* (2013.01)
*G10L 25/78* (2013.01)

(56) References Cited

U.S. PATENT DOCUMENTS

| | | | |
|---|---|---|---|
| 2015/0019682 A1* | 1/2015 | Lim | H04L 67/63 709/217 |
| 2015/0112800 A1* | 4/2015 | Binion | G06Q 30/0255 705/14.53 |
| 2015/0334346 A1* | 11/2015 | Cheatham, III | H04N 21/4367 348/14.05 |
| 2016/0260431 A1 | 9/2016 | Newendorp et al. | |
| 2017/0166219 A1* | 6/2017 | Jammoussi | G08G 1/0125 |
| 2017/0192486 A1* | 7/2017 | Park | H04B 5/72 |
| 2017/0357637 A1* | 12/2017 | Nell | H04L 12/2823 |
| 2018/0005625 A1* | 1/2018 | Han | G06F 3/167 |
| 2018/0011682 A1* | 1/2018 | Milevski | G06F 3/165 |
| 2018/0096696 A1* | 4/2018 | Mixter | G10L 15/30 |
| 2018/0233142 A1* | 8/2018 | Koishida | G10L 15/063 |
| 2018/0357473 A1* | 12/2018 | Soma | G06K 9/00335 |

FOREIGN PATENT DOCUMENTS

| | | |
|---|---|---|
| JP | 2014-63291 A | 4/2014 |
| JP | 2014-063291 A | 4/2014 |
| JP | 2016-035614 A | 3/2016 |
| JP | 2018-511218 A | 4/2018 |
| JP | 2019036201 A * | 3/2019 |
| WO | 2016/144982 A1 | 9/2016 |
| WO | WO-2016144982 A1 * | 9/2016 ............. G06F 3/167 |

* cited by examiner

FIG.9

| 520 | 522 | 524 | 526 | 528 | SENSOR INFORMATION | | | | |
|---|---|---|---|---|---|---|---|---|---|
| | | | | | 5300 | 5302 | 5304 | 5306 | 5308 |
| TRANSACTION ID | TRANS- MISSION SOURCE | TRANS- MISSION DESTINA- TION | SENSING START | SENSING END | SENSOR ID | TYPE | VENDOR | SENSI- TIVITY | POSITIONAL INFORMATION |
| 12345678 | REFRIG- ERATOR A | TERMINAL X | 2017/07/01 20:23 | 2017/07/01 20:41 | 1 | MICROPHONE | ABC | -75db | (10.0,20.0,30.0) |

530

| PAST EVALUATION | | SENSOR INFORMATION | SENSING RESULTS | | | |
|---|---|---|---|---|---|---|
| 5312 | 5314 | 5322 | 5324 | 5326 | 5328 |
| AVERAGE VALUE | positive COUNT | TYPE | AVERAGE VOLUME | AVERAGE PITCH | EMOTION TYPE |
| 3 | 12 | SOUND | 30.0 | 10.0 | happy |

530

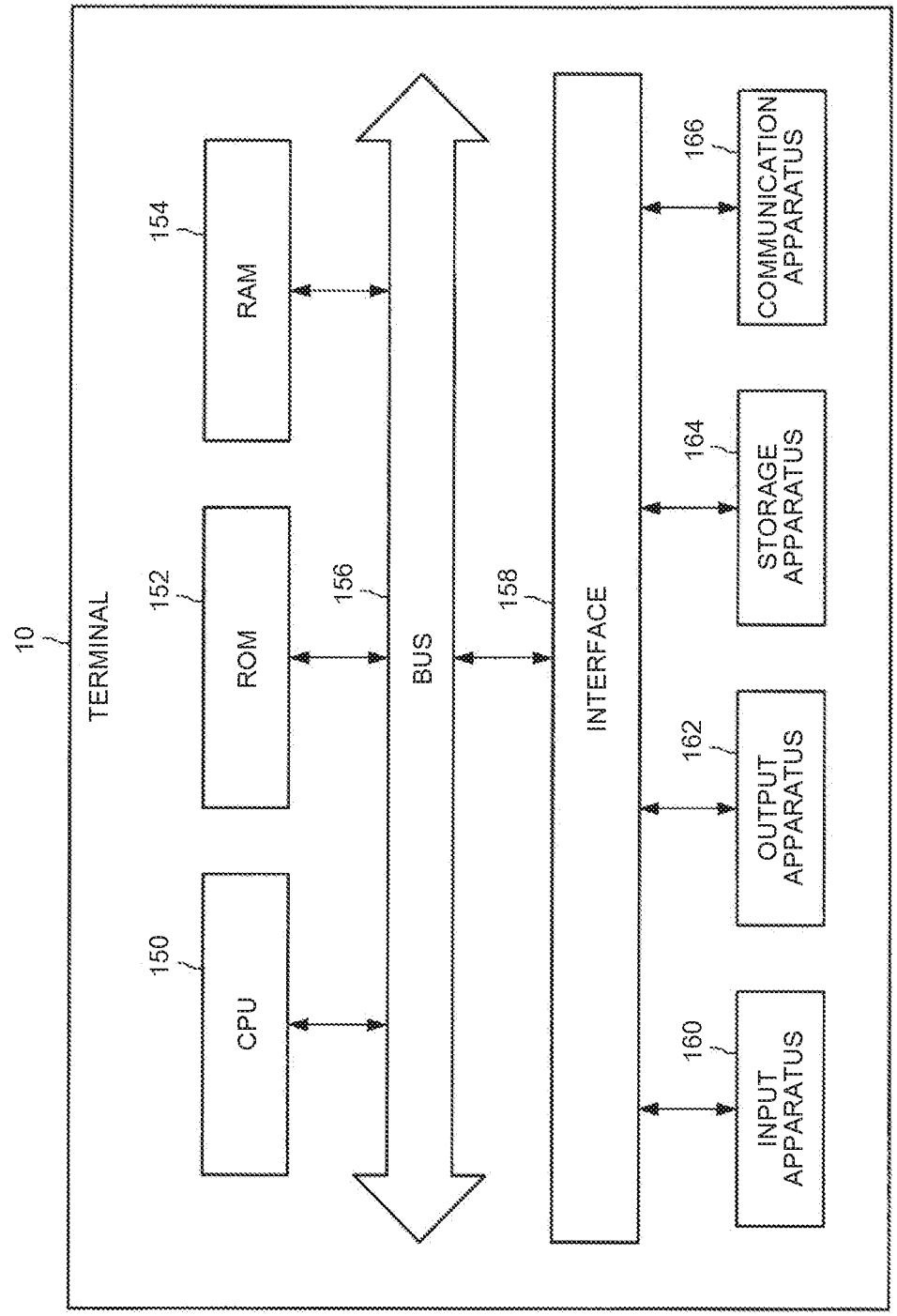

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/026381 filed on Jul. 12, 2018, which claims priority benefit of Japanese Patent Application No. JP 2017-192362 filed in the Japan Patent Office on Oct. 2, 2017. Each of the above-referenced applications is hereby incorporated herein by reference in its entirety.

FIELD

The present disclosure relates to an information processing apparatus, an information processing method, and a program.

BACKGROUND

Conventionally, various techniques for controlling speech outputs such as Text-to-Speech (TTS), for example, have been proposed.

For example, Patent Literature 1 below discloses a technique for changing speech which is output by a device in response to a detected person or operation.

CITATION LIST

Patent Literature

Patent Literature 1: JP 2016-35614 A.

SUMMARY

Technical Problem

Nevertheless, in the case of the technique disclosed in Patent Literature 1, no consideration is given to selecting, from among the results of sensing by a plurality of devices, sensing results which are used to estimate the state of a person.

Therefore, the present disclosure proposes a new and improved information processing apparatus, information processing method, and program that enable suitable determination of sensing results which are used in estimating a user state.

Solution to Problem

According to the present disclosure, an information processing apparatus is provided that includes: a determination unit that determines, on the basis of a predetermined reference, one or more second sensing results used in estimating a user state from among a plurality of first sensing results received from a plurality of devices; and an output control unit that controls an output of information on the basis of the one or more second sensing results.

Moreover, according to the present disclosure, an information processing method is provided that includes: determining, on the basis of a predetermined reference, one or more second sensing results used in estimating a user state from among a plurality of first sensing results received from a plurality of devices; and controlling, by a processor, an output of information on the basis of the one or more second sensing results.

Moreover, according to the present disclosure, a program is provided that causes a computer to function as: a determination unit that determines, on the basis of a predetermined reference, one or more second sensing results used in estimating a user state from among a plurality of first sensing results received from a plurality of devices; and an output control unit that controls an output of information on the basis of the one or more second sensing results.

Advantageous Effects of Invention

As explained above, the present disclosure enables suitable determination of sensing results which are used in estimating a user state. Note that the advantageous effects disclosed here are not necessarily limited, rather, the advantageous effects may be any advantageous effects disclosed in the present disclosure.

BRIEF DESCRIPTION OF DRAWINGS

FIG. 9 is a diagram illustrating a configuration example of sensing result transmission data in an applied example according to the first embodiment.

FIG. 29 is an explanatory diagram illustrating a hardware configuration example of the terminal 10 and which is common to each of the embodiments.

DESCRIPTION OF EMBODIMENTS

Preferred embodiments of the present invention will be explained in detail hereinbelow with reference to the accompanying drawings. Note that duplicate descriptions are omitted from the present specification and drawings by assigning the same reference signs to constituent elements which have substantially the same function configurations.

Furthermore, in the present specification and drawings, a plurality of constituent elements having substantially the same function configurations are sometimes distinguished by appending different alphabetical characters to the end of the same reference signs. For example, a plurality of constituent elements having substantially the same function configurations are distinguished as device 20a and device 20b where necessary. However, if there is no particular need to distinguish between a plurality of constituent elements having substantially the same function configurations, the same reference signs are appended to such constituent elements. For example, if there is no particular need to distinguish between the device 20a and the device 20b, same appear simply as the devices 20.

Furthermore, the "Description of Embodiments" will be provided in the following order:
1. First Embodiment
2. Second Embodiment
3. Hardware configurations
4. Modification examples The present disclosure may be carried out in a variety of modes as illustrated in detail in "1. First embodiment" to "2. Second embodiment" by way of an example. First, a first embodiment of the present disclosure will be described.

1. First Embodiment

1-1. System Configuration

Figure 1:
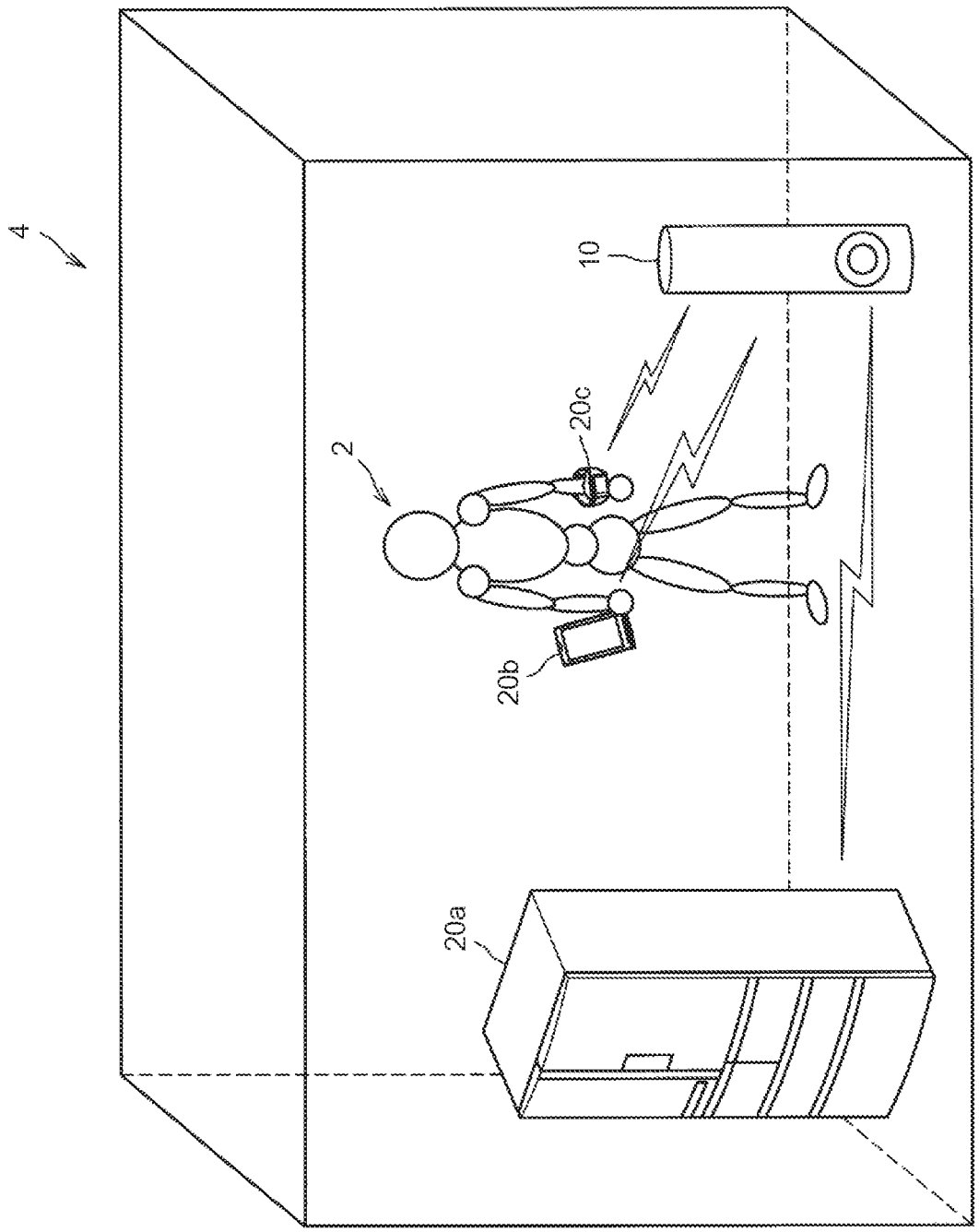
FIG. 1 is an explanatory diagram illustrating a configuration example of an information processing system according to a first embodiment of the present disclosure.

First, a configuration example of an information processing system according to the first embodiment will be described with reference to FIG. 1. As illustrated in FIG. 1, the information processing system according to the first embodiment has a terminal 10 and a plurality of devices 20.

For example, as illustrated in FIG. 1, the terminal 10 and the plurality of devices 20 can be located inside a predetermined space 4 (for example, in a house, in an office building or other facility, in a vehicle, or in a predetermined site outdoors, and so forth).

Note that, although FIG. 1 illustrates an example in which the terminal 10 and the plurality of devices 20 are located in the same room (inside space 4), the location of the terminal 10 and plurality of devices 20 is not limited to this example. At least one of the terminal 10 and the plurality of devices 20, and other equipment, may be located in mutually different rooms (inside space 4), or may be located on mutually different floors (inside space 4).

1-1-1. Terminal 10

The terminal 10 is an example of the information processing apparatus according to the present disclosure. The terminal 10 is an apparatus capable of outputting various information (for example, speech, video or music, and the like). For example, terminal 10 outputs, to a user 2 located in space 4, speech that corresponds to predetermined notification information of a predetermined application service. Alternatively, terminal 10 outputs speech for an interaction with user 2, of the predetermined application service. Here, speech may, for example, be synthesized speech such as TTS or may be recorded speech. A description with a focus on an example in which speech is synthesized speech will be provided hereinbelow.

This terminal 10 can be a stationary-type apparatus or a mobile apparatus, for example. By way of an example, terminal 10 may be a general-purpose personal computer (PC), a television receiver, video recording equipment, audio equipment (a loudspeaker or the like), a mobile phone such as a smartphone, for example, a tablet-type terminal, a digital camera, a portable music player, or a robot. A description with a focus on an example in which terminal 10 is a stationary-type apparatus in the form illustrated in FIG. 1, for example, will be provided hereinbelow.

Further, terminal 10 is capable of communicating with the plurality of devices 20 located in space 4 by means of wireless communications and/or wired communications.

1-1-2. Devices 20

The devices 20 are apparatuses arranged in space 4 or owned by user 2 (inside space 4). The devices 20 can be interconnected with other devices 20 and the terminal 10 as per a standard such as Digital Living Network Alliance (DLNA (registered trademark)), for example. Furthermore, the devices 20 may use a communications protocol such as Open Sound Control (OSC), for example, to send and receive sound data such as speech, for example, to and from other devices 20 and the terminal 10.

Although a refrigerator 20a, a smartphone 20b, and a smartwatch 20c are illustrated in FIG. 1 by way of examples of the devices 20, the devices 20 are not limited to this example. The devices 20 may, for example, be a stationary-type apparatus (for example, a household appliance or Internet of Things (IoT) device, or the like (a refrigerator, a microwave oven, a washing machine, a ventilating fan, a fixed-line telephone, a router, a general-purpose PC, a television receiver, video-recording equipment, audio equipment, or a robot, or the like)), a mobile apparatus (for example, a mobile phone such as a smartphone, a tablet-type terminal, a digital camera, or a portable music player, or the like), or a wearable apparatus (for example, a wearable (Head-Mounted Display (HMD), or the like), a smartwatch, a smartband, headphones, or earphones, or the like).

1-1-3. Problems to be Confronted

The configuration of the information processing system according to the first embodiment has been described hereinabove. Incidentally, because user 2 is able to move freely inside space 4, there may be cases where the terminal 10 is incapable of performing sensing with respect to user 2 or where sensing is difficult. In such cases, it is difficult for the terminal 10 to output information such as the speech of a notification to user 2, in a form that is suitable for the state of user 2, simply by using sensing results from terminal 10. Consequently, there is a risk that the content of this information will not be adequately relayed to user 2.

Therefore, focusing on the above issues resulted in the creation of the terminal 10 according to the first embodiment. The terminal 10 according to the first embodiment determines, on the basis of a predetermined reference, one or more selected sensing results used in estimating a user state from among a plurality of sensing results received from a plurality of devices 20, and controls an output of information on the basis of the one or more selected sensing results. Accordingly, even when the terminal 10 is in a situation where sensing with respect to user 2 is difficult, for example, the terminal 10 is capable of outputting information in a form that is suitable for a user state. Here, the selected sensing results are an example of second sensing results of the present disclosure. The content of the first embodiment will be described in further detail hereinbelow.

1-2. Configuration: Device 20

Figure 2:
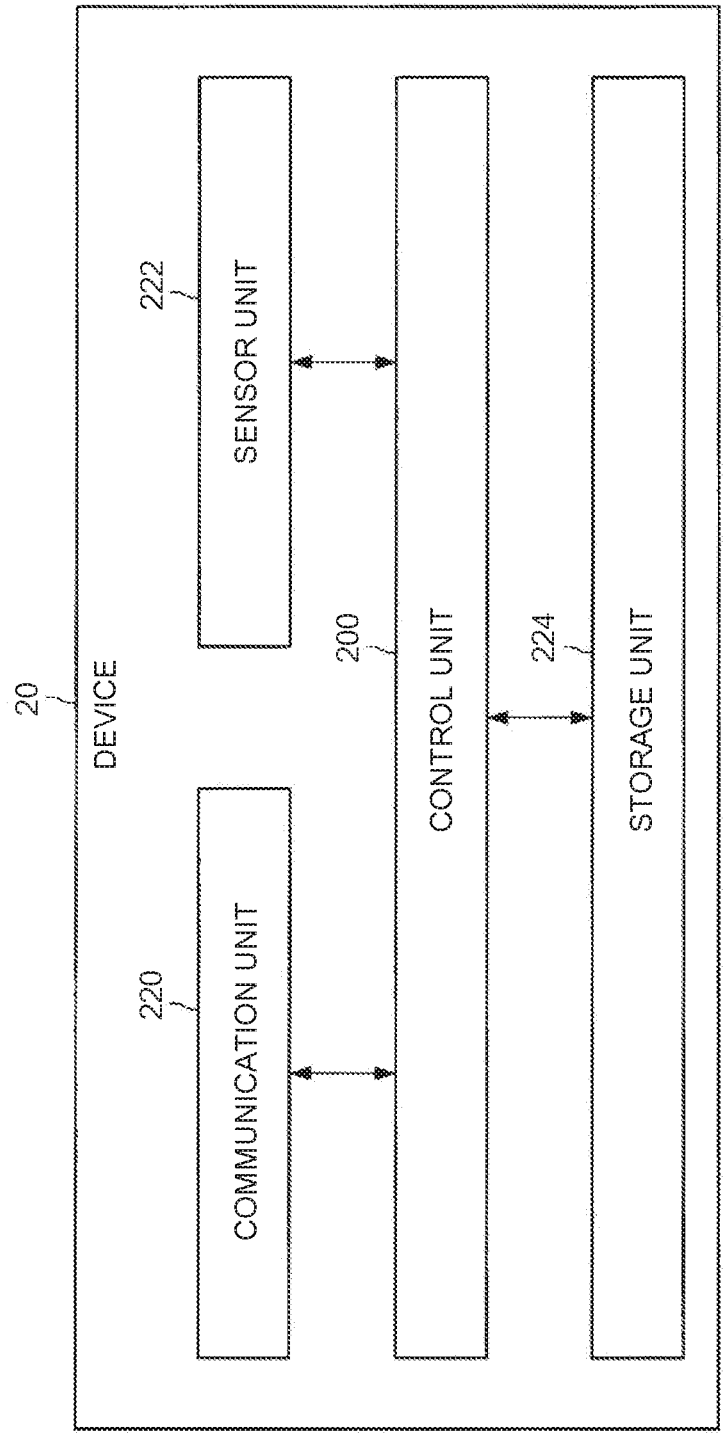
FIG. 2 is a functional block diagram illustrating a configuration example of a device 20 according to the first embodiment.

A configuration according to the first embodiment will be described next. FIG. 2 is a functional block diagram illustrating a configuration example of device 20 according to the first embodiment. As illustrated in FIG. 2, the terminal 10 has a control unit 200, a communication unit 220, a sensor unit 222, and a storage unit 224.

1-2-1. Sensor Unit 222

The sensor unit 222 may, for example, include at one of an acceleration sensor, an azimuth sensor, a distance sensor (for example, a time-of-flight system sensor or a stereo camera, or the like), a microphone, a temperature sensor, a camera (image sensor), a biometric sensor, and a myoelectric sensor. In addition, the sensor unit 222 may include a receiver that receives a positioning signal from a positioning satellite such as a Global Positioning System (GPS) or a Global Navigation Satellite System (GLONASS), for example.

The sensor unit 222 is capable of sensing with respect to the state of a user. For example, the sensor unit 222 performs sensing (imaging, or the like, for example) with respect to movement of the user. By way of an example, the sensor unit 222 may sense the speed, direction, and distance, or the like, of the movement of the whole body of the user. Alternatively, the sensor unit 222 may sense the movement of the head, hands, or neck of the user. The sensor unit 222 may alternatively sense the face (facial expression or the like, for example) of the user.

Alternatively, the sensor unit 222 senses information on the vitals of the user (for example, the amount of perspiration of the hands and feet, the heart rate, the respiration rate, or disrupted brain wave activity, and so forth). Alternatively, the sensor unit 222 senses the state of the eyes of the user (for example, the frequency and number of blinks, movement and direction of line of sight, pupil dilation, and so forth). Alternatively, the sensor unit 222 senses whether or not the user has made a sound and the types of sounds the user has made (for example, verbal sounds, non-verbal sounds (groans, howling, laughter, and so forth, for example), humming and singing, or non-speech sounds (coughing, sneezing, and so forth, for example)).

Note that the individual sensors included in the sensor unit 222 may perform continuous sensing, may perform sensing periodically, or may perform sensing only in specified cases (cases where there is an instruction from the control unit 200, or the like, for example).

1-2-2. Control Unit 200

The control unit 200 may be configured to include processing circuits such as a Central Processing Unit (CPU), a Graphics Processing Unit (GPU), or the like, for example. The control unit 200 integrally controls the operations of the terminal 10. For example, the control unit 200 controls the transmission of information to other apparatuses. The details will be provided subsequently, but in cases such as where a sensing results provision request has been received from the terminal 10, the control unit 200 causes the communication unit 220 to transmit the sensing results from the sensor unit 222 to the terminal 10.

In addition, the control unit 200 may perform predetermined recognition relating to the user state on the basis of the sensing results from the sensor unit 222. For example, on the basis of the sensing results from the sensor unit 222 (captured images of the whole body of the user, for example), the control unit 200 may be capable of recognizing user gestures (for example, nodding of the head, waving of the hands, sitting, standing, running, walking, staying still, intense movement, and so forth). Furthermore, the control unit 200 may be capable of recognizing user emotions on the basis of the sensing results from the sensor unit 222 (captured images of the face of the user, and so forth, for example). For example, on the basis of the sensing results, the control unit 200 may recognize whether or not a user emotion is a positive emotion (joy and so forth), or a negative emotion (sorrow and so forth).

In addition, the control unit 200 may be capable of recognizing the level of user concentration on the basis of the sensing results from the sensor unit 222. Furthermore, the control unit 200 may be capable of recognizing the level of relaxation of the user on the basis of the sensing results from the sensor unit 222. By way of an example, the control unit 200 first recognizes whether or not the user is "resting" on the basis of the sensing results. Furthermore, if it is recognized that the user is "resting", the control unit 200 may recognize that the level of relaxation of the user is equal to or greater than a predetermined threshold value. On the other hand, if it is recognized that the user is "not resting", the control unit 200 may recognize that the level of relaxation of the user is less than the predetermined threshold value.

1-2-3. Communication Unit 220

The communication unit 220 sends and receives information to and from other apparatuses by means of wireless communications and/or wired communications, for example. For example, the communication unit 220 sends, to the terminal 10, sensing results from various sensors (all of the sensors and the like, for example) included in the sensor unit 222 according to control by the control unit 200. Furthermore, the communication unit 220 can receive, from the terminal 10, a request to provide the sensing results of the sensor unit 222 or, as described subsequently, information indicating a user evaluation grade.

1-2-4. Storage Unit 224

The storage unit 224 stores various data and various software. For example, whenever the information indicating the user evaluation grade is received from terminal 10, the storage unit 224 stores the information indicating the user evaluation grade.

1-3. Configuration: Terminal 10

Figure 3:
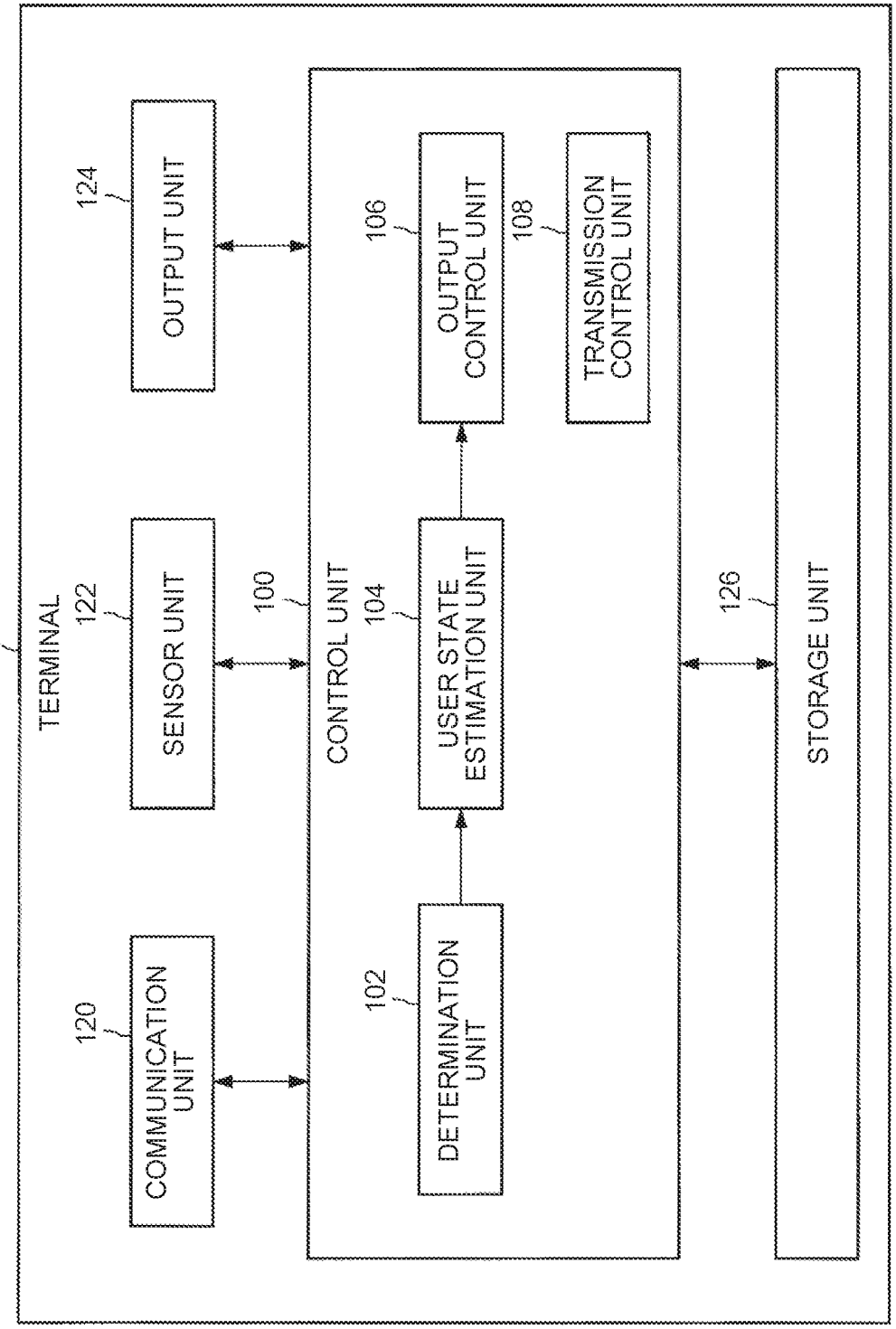
FIG. 3 is a functional block diagram illustrating a configuration example of a terminal 10 according to the first embodiment.

A configuration example of the terminal 10 according to the first embodiment will be described next. FIG. 3 is a functional block diagram illustrating a configuration example of the terminal 10 according to the first embodiment. As illustrated in FIG. 3, the terminal 10 has a control unit 100, a communication unit 120, a sensor unit 122, an output unit 124, and a storage unit 126.

1-3-1. Sensor Unit 122

The sensor unit 122 can include one or more cameras (image sensors) and a microphone with a plurality of channels (8ch, or the like, for example). For example, by virtue of having the microphone with a plurality of channels, the terminal 10 is capable of estimating the position of a sound source on the basis of sound collection results from the microphone.

In addition, the sensor unit 122 may, for example, include one or more of an acceleration sensor, an azimuth sensor, a distance sensor (for example, a time-of-flight system sensor or a stereo camera, or the like), a temperature sensor, a biometric sensor, and a myoelectric sensor. Furthermore, the sensor unit 122 may include a receiver that receives a positioning signal from a positioning satellite such as a GPS or GLONASS, for example.

1-3-1-1. User-Related Sensing

The sensor unit 122 can perform sensing with respect to user states (for example, user movements, user eye states, and types of sounds made by the user, and so forth). Note that a portion of the specific sensing content from the sensor unit 122 may also be the same as for the sensor unit 122 of the devices (mentioned earlier).

1-3-1-2. Feedback Sensing

As will be described subsequently with reference to FIG. 11, if the user provides feedback utterances regarding information outputs by the output unit 124, the sensor unit 122 (the microphone, for example) is also capable of sensing these feedback utterances. For example, after information such as notification information for the user has been output by the output unit 124, the user is able to make feedback utterances regarding the information output. In this case, the sensor unit 122 can sense the feedback utterances. Thus, terminal 10 can specify a user evaluation grade for the foregoing information output on the basis of the sensing results.

Alternatively, in response to the information output, the user can transmit, to the terminal 10, feedback information regarding the information output by using a predetermined communications terminal (instead of utterances). In this case, the communication unit 120, described subsequently, may receive the feedback information.

Note that the individual sensors included in the sensor unit 122 may perform continuous sensing, may perform sensing periodically, or may perform sensing only in specified cases (cases where there is an instruction from the control unit 100, for example).

1-3-2. Control Unit 100

The control unit 100 may be configured to include processing circuits such as a CPU 150, described subsequently, and a GPU, or the like, for example. The control unit 100 integrally controls the operations of the terminal 10. In addition, as illustrated in FIG. 3, the control unit 100 has a determination unit 102, a user state estimation unit 104, an output control unit 106, and a transmission control unit 108.

For example, the control unit 100 may perform predetermined recognition relating to user states (for example, gesture recognition and emotion recognition, and the like) on the basis of the sensing results from the sensor unit 122. Note that a portion of the specific recognition content from the control unit 100 may also be the same as for the control unit 200 of the devices 20 (mentioned earlier).

1-3-3. Determination Unit 102

The determination unit 102 determines, on the basis of a predetermined reference, one or more selected sensing results used in estimating a user state from among a plurality of sensing results received from the plurality of devices 20. For example, for each of a plurality of sensing types, the determination unit 102 determines the one or more selected sensing results by selecting, on the basis of the predetermined reference, the sensing results that correspond to the sensing type, respectively, from among a plurality of sensing results received from the plurality of devices 20. Here, each of the plurality of sensing types may correspond to the type of each sensor. For example, the plurality of sensing types may include imaging, sound collection, and acceleration sensing, or heart rate sensing, or the like.

Alternatively, the determination unit 102 can also determine, on the basis of the predetermined reference, the one or more selected sensing results from among the plurality of sensing results received from the plurality of devices 20 and the sensing results from the sensor unit 122. For example, for each of the plurality of sensing types and on the basis of the propriety of the user-related sensing that corresponds to the sensing type by the sensor unit 122, or the accuracy of the user-related sensing results that correspond to the sensing type by the sensor unit 122, and on the basis of the predetermined reference, the determination unit 102 may determine the one or more selected sensing results by selecting, on the basis of the predetermined reference, the sensing results that correspond to the sensing type, respectively, from among the plurality of sensing results received from the plurality of devices 20 and the sensing results from the sensor unit 122.

By way of an example, for each of the plurality of sensing types, if the determination unit 102 determines that the user-related sensing that corresponds to the sensing type by the sensor unit 122 is impossible or if the accuracy of the user-related sensing results that correspond to the sensing type by the sensor unit 122 is lower than a predetermined threshold value, the determination unit 102 may select, on the basis of the predetermined reference, the sensing results that correspond to the sensing type, respectively, from among only the plurality of sensing results received from the plurality of devices 20. In other words, in this case, the sensing results that correspond to the sensing type by the sensor unit 122 are not selected as the one or more selected sensing results.

For example, if the user cannot be seen in their entirety in an image captured by the camera of the sensor unit 122 or if only a portion of the body of the user can be seen, the determination unit 102 may select, as images and on the basis of the predetermined reference, one or more of any of the plurality of images received from the plurality of devices 20. Alternatively, if the volume level of a sound made by the user in sound collection results by the microphone of the sensor unit 122 is equal to or less than a predetermined threshold value, the determination unit 102 may select, as sounds and on the basis of the predetermined reference, one or more of any of a plurality of sound collection results received from the plurality of devices 20.

1-3-3-1. Predetermined Reference

First Reference

The function of the foregoing determination unit 102 (the determination of selected sensing results) will be described in further detail hereinbelow. The foregoing predetermined reference may include the distance between each of the plurality of devices 20 and the user (may also be called the first reference hereinbelow). For example, for each of the plurality of sensing types, the determination unit 102 may determine the one or more selected sensing results by selecting, from among the plurality of sensing results received from the plurality of devices 20, the sensing results that correspond to the sensing type by the device 20 closest to the user, respectively, among the plurality of devices 20.

Second Reference

Furthermore, the foregoing predetermined reference may include performance information of each of the plurality of devices 20 (may also be called the second reference hereinbelow). For example, for each of the plurality of sensing types, the determination unit 102 may select, from among a plurality of sensing results received from a plurality of devices 20, the sensing results that correspond to the sensing type by the device 20 having a superior sensing performance for the sensing type, respectively, among the plurality of devices 20. By way of an example, with regard to images, the determination unit 102 may select, from among a plurality of images received from a plurality of devices 20, an image that has been captured by the device 20 with the highest camera pixel count among the plurality of devices 20.

Third Reference

Furthermore, the foregoing predetermined reference may include the reliability level (may also be called the third reference hereinbelow) of the manufacturing source for each of the plurality of devices 20. For example, for each of the plurality of sensing types, the determination unit 102 may select, from among a plurality of sensing results received from a plurality of devices 20, the sensing results that correspond to the sensing type of a device 20 for which the manufacturing source (the manufacturer or country of manufacture, for example) is more reliable, respectively, among the plurality of devices 20.

Note that the reliability of each manufacturing source may be pre-registered. For example, the reliability of each manufacturing source may be pre-stored in the storage unit 126 or may be stored in an external apparatus (not illustrated) with which terminal 10 is capable of communicating via a predetermined network (the internet or the like), for example.

Fourth Reference

Further, the foregoing predetermined reference may include a user evaluation grade (sometimes also called the fourth reference hereinbelow) that is associated with each of the plurality of devices 20. For example, for each of the plurality of sensing types, the determination unit 102 may select, from among a plurality of sensing results received from a plurality of devices 20, the sensing results that correspond to the sensing type by a device 20 having a higher user evaluation grade stored in association with each of the plurality of devices 20, respectively.

Combinations

Note that the foregoing predetermined reference may be a combination of a plurality of types of references. For example, the combination may be a combination of two or more of any of the foregoing four types of references or may be a combination of five or more types of references including the foregoing four types of references. In such cases, for each of the plurality of sensing types, the determination unit 102 may select, from among a plurality of sensing results received from a plurality of devices 20, the sensing results that correspond to the sensing type, respectively, on the basis of the combination of the plurality of types of references and on the basis of a priority level associated with each of the plurality of types of references.

For example, the respective priority levels of the four types of priority levels may be prescribed such that the priority levels are, in descending order, a first reference (the distance between the devices 20 and the user), a second reference (the performance information of the devices 20), a third reference (the reliability level of the manufacturing source of the devices 20), and a fourth reference (a history of user evaluation grades for the devices 20). By way of an example, for each of the four types of references, the higher the priority level of the reference, the greater the weighting (factor) that is configured. In this case, the determination unit 102 first calculates, according to sensing type and for each of the plurality of sensing results received from the plurality of devices 20, a weighted sum by using a value (evaluation value) obtained by evaluating the sensing results on the basis of each of the four types of references, and a weighting configured for each of the four types of references. Further, the determination unit 102 may determine, according to sensing type, the one or more selected sensing results by selecting the sensing results with the highest calculated weighted sum, respectively, from among the plurality of sensing results.

1-3-3-2. Modification Examples

As a modification example, the respective priority levels of the four types of references may be prescribed individually for each sensing type. For example, the reference with the highest priority level with respect to the sensing of speech and acceleration may be prescribed as the first reference and the reference with the highest priority level with respect to the sensing of images (camera) may be prescribed as the second reference.

As another modification example, for the camera (image sensing), the determination unit 102 may prioritize (as the selected sensing results) selection of captured images in which the face of the user is seen over selection of captured images in which the face of the user cannot be seen, instead of the selection being dependent on the first reference (the distance between the devices 20 and the user), for example. By means of this selection example, terminal 10 may be capable of recognizing the facial expressions of the user more accurately on the basis of the captured images. Thus, the accuracy with which user emotions are estimated can be improved.

As another modification example, the determination unit 102 may, with respect to sound, select (as the selected sensing results) one or more of the plurality of sensing results received from the plurality of devices 20 on the basis of a determination result regarding whether the sound of a collected user utterance is a direct sound or an indirect sound (reflected sound or the like). For example, the determination unit 102 may prioritize (as the selected sensing results) selection of sound collection results obtained by collecting user utterance sounds as direct sounds over selection of sound collection results obtained by collecting sounds (user utterance sounds) as indirect sounds.

1-3-4. User State Estimation Unit 104

1-3-4-1. User State Estimation

The user state estimation unit 104 estimates a user state by using one or more selected sensing results which have been determined by the determination unit 102. For example, a plurality of types of predetermined states may be predefined. In this case, the user state estimation unit 104 may estimate whether a user state is any of the plurality of types of predetermined states, on the basis of predetermined determination references and of the one or more selected sensing results. Here, the predetermined determination references may include, for example, a determination result regarding whether or not the user is in an active state, a determination result regarding the type of sound made by the user, a determination result regarding whether or not the user is resting, a determination result regarding the concentration level of the user, and the like.

Here, the plurality of types of predetermined states include three types, namely, a "state for which notification should be emphasized", a "state requiring subsequent notification", and a "normal state", for example. A "state for which notification should be emphasized" may be a state for which an information notification should be delivered to the user with greater emphasis than in a normal configuration (in other words, a state where the attention of the user should be gained). A "state requiring subsequent notification" may be a state for which information should not be output to the user currently and for which an information notification should be delivered after a predetermined time period has elapsed (in other words, a state where the user should be left alone). A "normal state" may be a state where notification information should be delivered to the user in a normal configuration. Note that, by way of a specific estimation example, "Sections 1 to 7", for example, are provided subsequently.

1-3-4-2. Determination Relating to Predetermined Determination Reference

Note that the user state estimation unit 104 is also capable of making a determination that corresponds to the foregoing predetermined determination references. For example, the user state estimation unit 104 determines whether or not the user is in an active state by using the one or more selected sensing results. By way of an example, the user state estimation unit 104 may first recognize part of the body of the user that is moving by using the one or more selected sensing results. Then, if the part of the body that is moving is large, the user state estimation unit 104 determines that the user is in an active state. Furthermore, if the part of the body that is moving is small, the user state estimation unit 104 determines that the user is in an inactive state.

Further, the user state estimation unit 104 may determine whether or not the user has made a sound and may determine the type of sound made by the user by using the one or more selected sensing results (the collected sound results, for example). For example, the user state estimation unit 104 determines whether the type of sound made by the user is any of a verbal sound, humming, singing, a non-verbal sound, and a non-speech sound.

In addition, the user state estimation unit 104 is able to determine whether or not the user is resting by using the one or more selected sensing results. For example, the user state estimation unit 104 first determines the level of relaxation of the user by using the one or more selected sensing results. Then, if it is determined that the relaxation level is equal to or greater than a predetermined threshold value, the user state estimation unit 104 determines that the user is "resting". Furthermore, if it is determined that the level of relaxation is less than the predetermined threshold value, the user state estimation unit 104 determines that the user is "not resting".

In addition, the user state estimation unit 104 may determine the concentration level of the user by using the one or more selected sensing results (captured images of the face, or the like, for example). For example, the user state estimation unit 104 first determines the number of blinks of the user by using the one or more selected sensing results. Furthermore, if it is determined that the number of blinks of the user is equal to or greater than a predetermined threshold value, the user state estimation unit 104 determines that the user is not concentrating. In addition, if the number of blinks of the user is less than the predetermined threshold value, the user state estimation unit 104 determines that the user is not concentrating.

1-3-5. Output Control Unit 106

The output control unit 106 controls outputs of information (video, speech, music, and the like, for example) by the output unit 124, which will be described subsequently. For example, the output control unit 106 causes the output unit 124 to output information such as notification information for the user, for example, on the basis of a user state estimated by the user state estimation unit 104.

By way of an example, the output control unit 106 causes the output unit 124 to output speech that corresponds to the notification information for the user (sometimes also called "notification speech" hereinbelow), in an output form that corresponds to the user state estimated by the user state estimation unit 104. In addition, the output control unit 106 may determine notification timing for the notification information on the basis of the user state estimated by the user state estimation unit 104 and may cause the output unit 124 to output, with the notification timing, speech that corresponds to the notification information.

1-3-5-1. Control Example 1

For example, suppose that it is estimated by the user state estimation unit 104 that the user state is a "state for which notification should be emphasized". In this case, the output control unit 106 may change the speaker (from a normal speaker) to a speaker who speaks with a tense voice or to a speaker with the tone of a DJ, for example. Alternatively, the output control unit 106 may perform a change from a normal speaker to a user-preferred speaker pre-registered by the user. Moreover, the output control unit 106 may change the wording of the speech according to the speaker after the change.

In addition, in this case, the output control unit 106 may change the timing of speech outputs by outputting the notification speech for the user according to timing at which the user is switching between movements, for example. Furthermore, the output control unit 106 may change the speech quality (from a normal configuration) to raise the pitch, may speed up the rate of speech (from a normal configuration), or may increase the speech volume level (from a normal configuration), for example. In addition, the output control unit 106 may add other TTS content (for example, TTS content not affecting the notification, and the like) to the notification speech and cause the output unit 124 to output the content after the addition.

1-3-5-2. Control Example 2

By way of another example, suppose that it is assumed by the user state estimation unit 104 that the user state is a "state requiring subsequent notification". In this case, the output control unit 106 may not output the notification information according to the notification timing associated with the notification information for the user and may cause the output unit 124 to output the notification information after a predetermined time period has elapsed since the notification timing. For example, when the current time has reached the notification timing associated with notification information for the user, the output control unit 106 first changes the speaker (from a normal speaker) to a speaker who speaks calmly or to a speaker with the tone of a counselor, or the like, for example, and causes the output unit 124 to output only TTS to indicate the presence of notification information, such as, for example, "there is a notice but handle it later". Further, the output control unit 106 causes the output unit 124 to output speech that corresponds to the notification information after a predetermined time period has elapsed since the notification timing (or with timing at which a user state newly estimated by the user state estimation unit 104 has changed to a state other than a "state requiring subsequent notification").

1-3-6. Transmission Control Unit 108

The transmission control unit 108 controls the transmission of various information to other apparatuses. For example, the transmission control unit 108 causes the communication unit 120 to transmit a sensing results provision request to the plurality of devices 20 (all the devices 20, for example) in space 4. Furthermore, if feedback is obtained from the user regarding the information output after the information has been output by the output unit 124, the transmission control unit 108 causes the communication unit 120 to transmit, to the plurality of devices 20, information indicating a user evaluation grade that corresponds to the feedback. For example, the transmission control unit 108 may cause the communication unit 120 to transmit the information indicating the user evaluation grade only to individual devices 20 that have sensed each of the foregoing one or more selected sensing results.

1-3-7. Communication Unit 120

The communication unit 120 may be configured to include a communication apparatus 166, described subsequently. The communication unit 120 sends and receives information to and from other apparatuses by means of wireless communications and/or wired communications. For example, the communication unit 120 transmits, to the plurality of devices 20 according to control by the transmission control unit 108, a sensing results provision request and information indicating a user evaluation grade, and the like. Furthermore, the communication unit 120 receives sensing results from the plurality of devices 20 in space 4.

1-3-8. Output Unit 124

The output unit 124 may be configured to include an output apparatus 162, described subsequently. The output unit 124 outputs various information (video, sound, and the like) according to control by the output control unit 106. The output unit 124 may have a speech output unit. The speech output unit is configured to include a loudspeaker, earphones, or headphones, or the like, for example. The speech output unit outputs sound (speech, music, and the like) according to control by the output control unit 106.

In addition, the output unit 124 may include a display unit. The display unit is configured to include a Liquid-Crystal Display (LCD), an Organic Light-Emitting Diode (OLED), or similar), or a projector, or the like, for example. The display unit displays (projects, or similar) video according to control by the output control unit 106.

1-3-9. Storage Unit 126

The storage unit 126 may be configured to include the storage apparatus 164, described subsequently. The storage unit 126 stores various data and various software. For example, the storage unit 126 stores information, which indicates a user evaluation grade relating to an information output by the output unit 124 and which has been acquired by the communication unit 120 or the sensor unit 122, in association with the individual devices 20 that have sensed each of the one or more selected sensing results determined by the determination unit 102.

1-4. Applied Example

Figure 4:
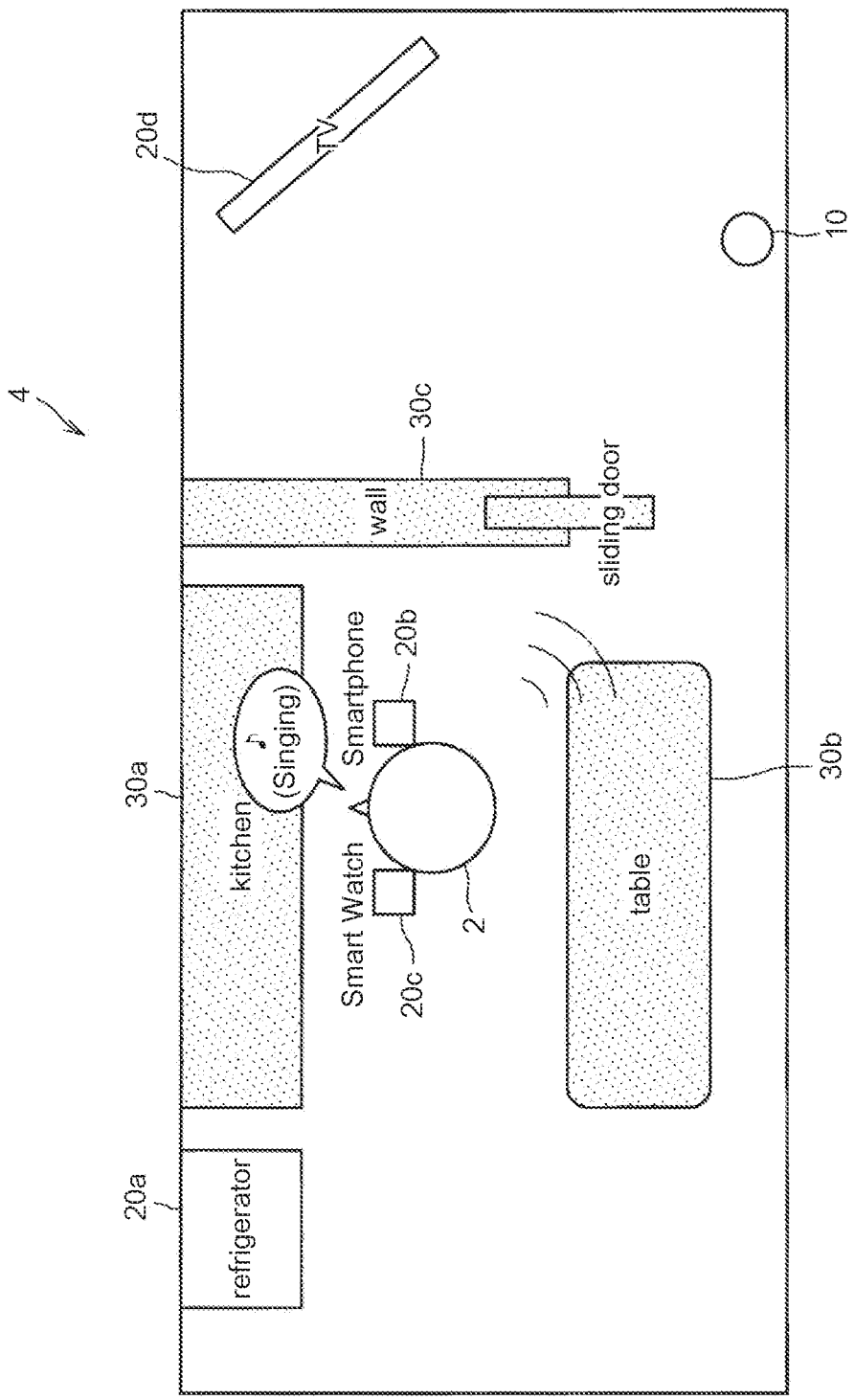
FIG. 4 is a diagram to illustrate an applied example according to the first embodiment.

The configuration of the first embodiment has been described hereinabove. An applied example according to the first embodiment will be described next with reference to FIGS. 4 to 13. FIG. 4 is a diagram to illustrate this applied example.

1-4-1. Before Information Notification Timing Arrives

As illustrated in FIG. 4, in this applied example, it is assumed that a user 2, a terminal 10, a plurality of devices 20 (for example, a refrigerator 20a, a smartphone 20b, a smartwatch 20c, and a television receiver 20d, and the like), and a plurality of obstacles 30 (for example, a kitchen counter 30a, a table 30b, and a wall 30c, and the like) are located in space 4.

Here, the user 2 has the smartphone 20b attached to their neck by using a neck strap, for example. Furthermore, the user 2 is wearing the smartwatch 20c on their arm. In addition, as illustrated in FIG. 4, the user 2 is singing a song.

The refrigerator 20a also has a built-in high-sensitivity microphone, high-sensitivity camera, and GPS receiver. For example, the refrigerator 20a is capable of collecting speech of the user 2, capturing an image of the whole body of the user 2, and sensing positional information of the refrigerator 20a. The smartphone 20b has a built-in microphone, acceleration sensor, and GPS receiver. For example, the smartphone 20b is capable of collecting speech of the user 2 and sensing acceleration and positional information of the smartphone 20b. The smartwatch 20c has a built-in camera, acceleration sensor, and GPS receiver. For example, the smartwatch 20c is capable of capturing an image of the periphery of the smartwatch 20c (including part of the body of the user 2) and sensing acceleration and positional information of the smartphone 20b.

Figure 5:
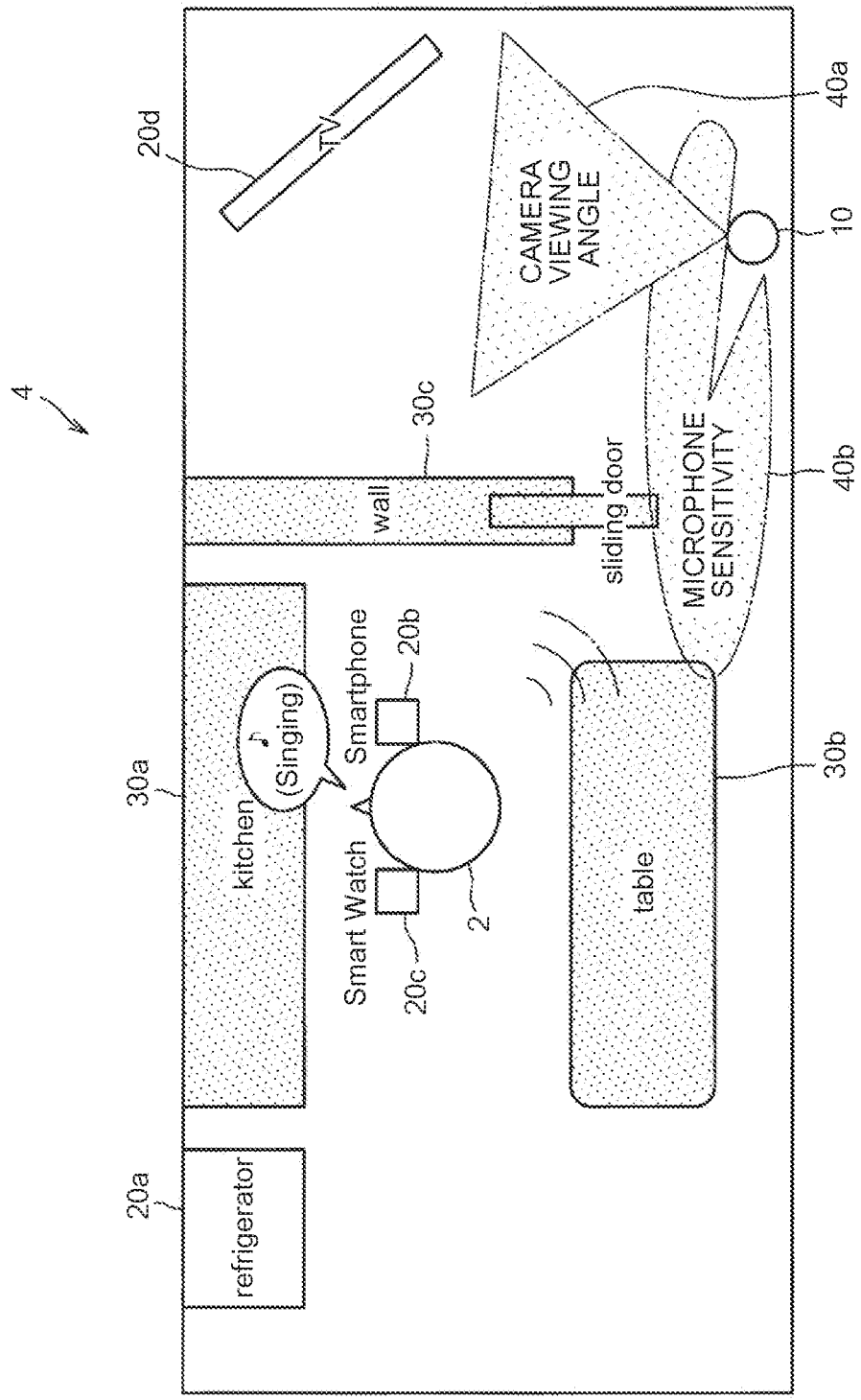
FIG. 5 is a diagram to illustrate an applied example according to the first embodiment.

FIG. 5 is a diagram illustrating the range within which the sensor unit 122 of the terminal 10 is capable of sensing, in the situation illustrated in FIG. 4. As illustrated in FIG. 5, the user 2 is not located within the viewing angle 40a of the camera in the sensor unit 122. Hence, the user 2 cannot be seen in images captured by the camera. Accordingly, the terminal 10 cannot recognize the movement of user 2 by using the captured images from the camera.

Furthermore, as illustrated in FIG. 5, the user 2 is located spaced apart from a range 40b within which the microphone of the sensor unit 122 is capable of collecting sound, and an obstacle 30c (a wall and a sliding door) of a fixed height is located between the range 40b permitting sound collection, and the user 2. Hence the microphone can barely collect any speech of the user 2.

1-4-2. When Information Notification Timing Arrives

Figure 6:
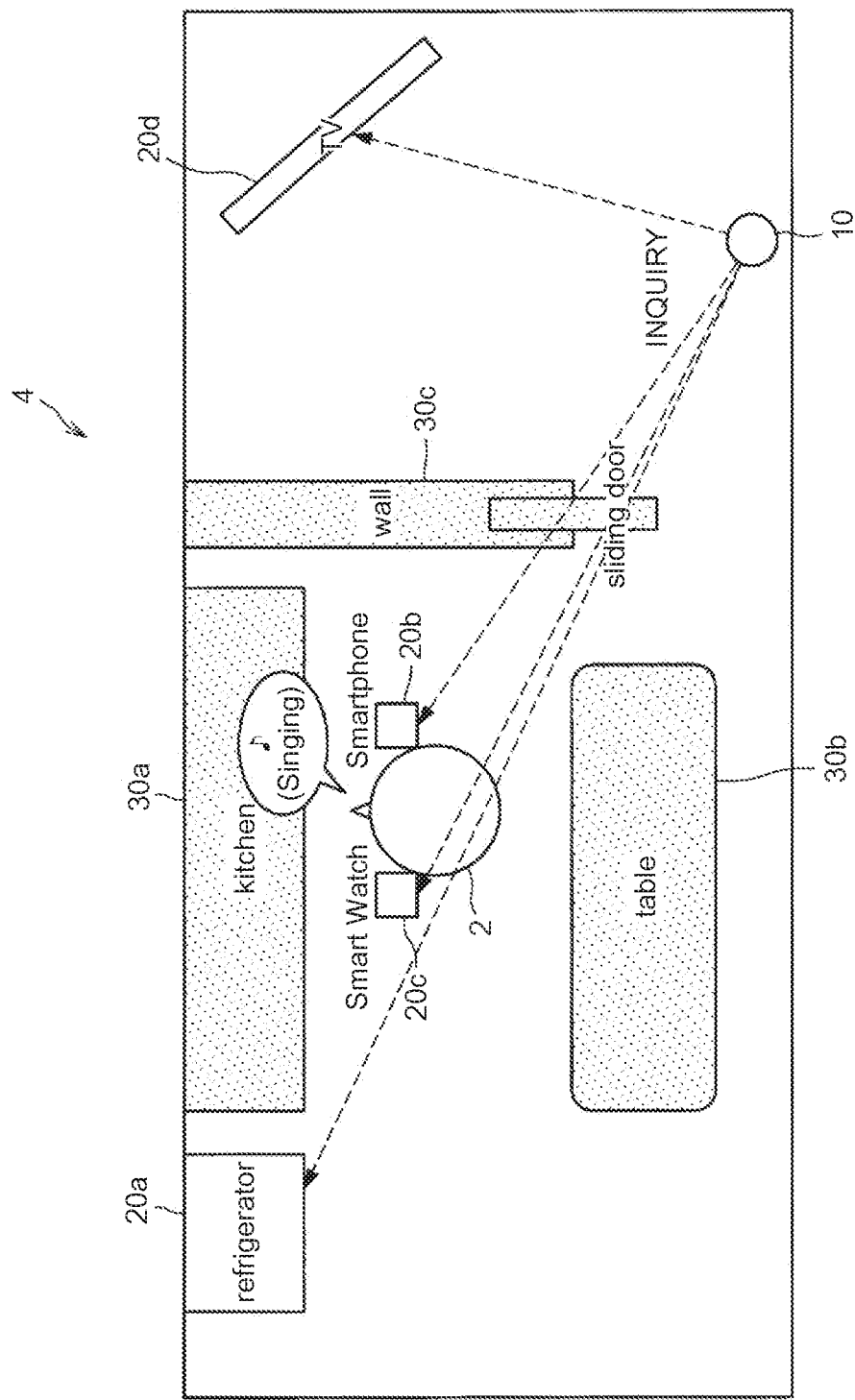
FIG. 6 is a diagram to illustrate an applied example according to the first embodiment.

In the situation illustrated in FIG. 4 (and FIG. 5), it is assumed that the notification timing for the predetermined notification information for user 2 has arrived. As mentioned earlier, in the situation illustrated in FIG. 4, the terminal 10 can barely acquire the sensing results available for user state estimation. Thus, in order to collect the sensing results available for user state estimation, the transmission control unit 108 of the terminal 10 causes the communication unit 120 to transmit the sensing results provision request to all the devices 20 in space 4, as illustrated in FIG. 6.

Figure 7:
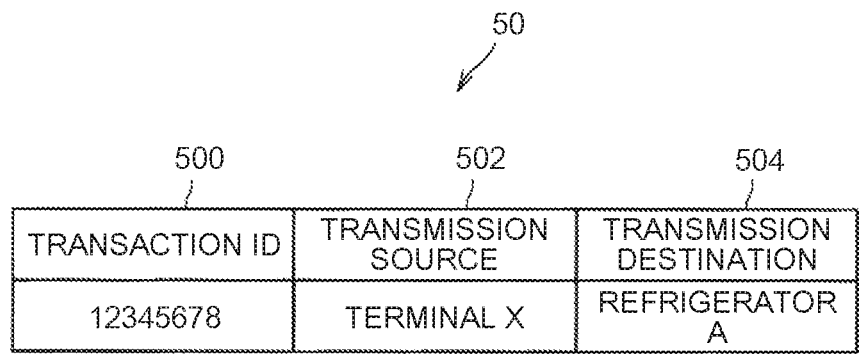
FIG. 7 is a diagram illustrating a configuration example of data of a sensing results provision request.

FIG. 7 is a diagram illustrating a configuration example of data in the sensing results provision request (provision request data 50). As illustrated in FIG. 7, the provision request data 50 includes, for example, a transaction ID 500, a transmission source 502, and a transmission destination 504. Here, the transmission source 502 stores identification information of the terminal 10. The transmission destination 504 stores identification information of each device (the refrigerator 20a in the example illustrated in FIG. 7).

1-4-3. Transmission of Sensing Results

Figure 8:
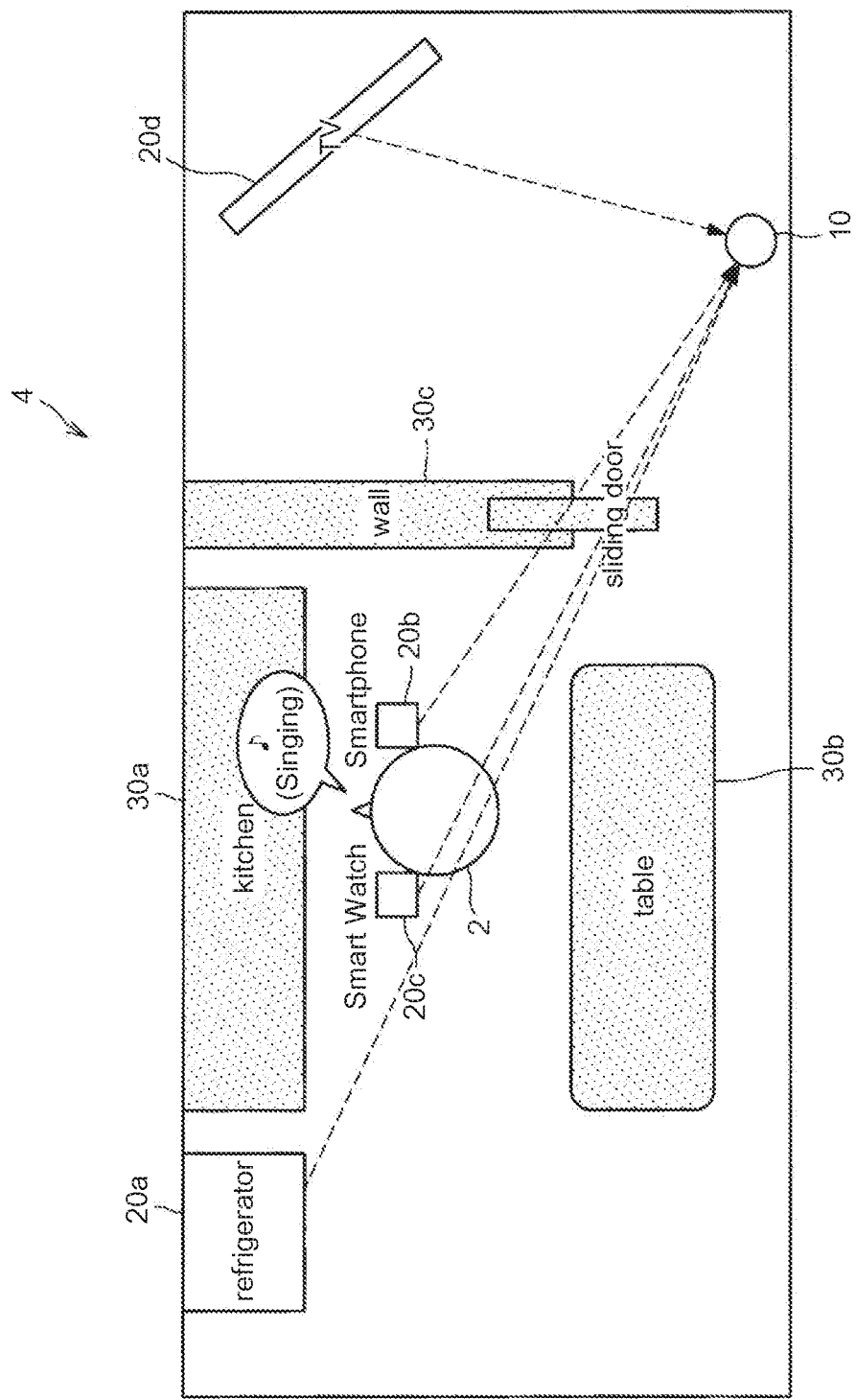
FIG. 8 is a diagram to illustrate an applied example according to the first embodiment.

Thereafter, a sensing results provision request is received by each of the devices 20. In this case, as illustrated in FIG. 8, each of the devices 20 transmits, to the terminal 10, the sensing results from the sensor unit 222 (the sensing results and the like at the time the provision request is received, for example).

FIG. 9 is a diagram illustrating a configuration example of transmission data in the sensing results from each device 20 (sensing results transmission data 52). As illustrated in FIG. 9, the sensing results transmission data 52 includes, for example, a transaction ID 520, a transmission source 522, a transmission destination 524, a sensing start date and time 526, a sensing end date and time 528, and sensor information 530. Here, the transmission source 522 stores identification information of each device 20 (the refrigerator 20a in the example illustrated in FIG. 9). The transmission destination 524 stores identification information of terminal 10. The sensing start date and time 526 records the sensing start date and time of the sensing results. The sensing end date and time 528 records the sensing end date and time of the sensing results. By recording the sensing start date and time and the sensing end date and time in this manner, it is possible to specify a sensing interval in the sensing results.

In addition, as illustrated in FIG. 9, the sensor information 530 includes a sensor ID 5300, a sensor type 5302, a vendor 5304, a sensitivity 5306, positional information 5308, a past evaluation 5310, and sensing results 5320. Note that, in FIG. 9, an example in which only the data of one type of sensing results (specifically, sound collection results) is recorded as the sensor information 530, but the sensor information 530 is not limited to this example, rather, respective sensing results data for all the sensors of the device 20 (the refrigerator 20a in the example illustrated in FIG. 9), for example, may be recorded.

Here, the sensor ID 5300 records the ID allocated to the individual sensors of the device 20. The sensor type 5302 records the type of the sensor with the ID. The vendor 5304 records the manufacturer of the sensor (or the device) with the ID. The sensitivity 5306 records performance information such as the sensitivity of the sensor with the ID. The positional information 5308 records positional information for the device (or the sensor with the ID) that has been acquired by means of a GPS receiver or the like, for example.

The past evaluation 5310 stores user evaluation history information that corresponds to the sensor with the ID. More precisely, the past evaluation 5310 may store evaluation history information obtained as a result of the terminal 10 selecting, as selected sensing results, the sensing results from the sensor with the ID and of acquiring, from the user, information regarding an information output when the output has been made to the user, on the basis of the sensing results. As illustrated in FIG. 9, the past evaluation 5310 includes an average value 5312 and a positive count 5314. The average value 5312 records an average value for the evaluation levels, obtained from the user in the past, that correspond to the sensor with the ID. The positive count 5314 records the number of times a positive evaluation (response), which corresponds to the sensor with the applicable ID, has been obtained from the user in the past.

In addition, the sensing result 5320 records information relating to the sensing results from the sensor with the ID. As illustrated in FIG. 9, if the sensor with the ID is the "microphone", the sensing result 5320 includes, for example, a type 5322, an average volume level 5324, an average pitch 5326, and an emotion type 5328. Here, the type 5322 records the type of information (sound, image, acceleration, and the like, for example) sensed by the sensor with the ID. The emotion type 5328 records the recognition results (for example, the type of emotion, and the like) if the device 20 is capable of recognizing the emotions of the user 2 on the basis of the sensing results from the sensor with the ID.

1-4-4. Determination of Selected Sensing Results

Thereafter, for each of a plurality of sensing types, the determination unit 102 of terminal 10 determines one or more selected sensing results by selecting, on the basis of the predetermined reference, the sensing results that correspond to the sensing type, respectively, from among a plurality of sensing results received from the plurality of devices 20.

For example, where sound sensing (sound collection) is concerned, suppose that a higher priority level is prescribed for the distance between the devices 20 and the user 2 (the first reference) than for the performance information of the devices 20 (the second reference). In the example illustrated in FIGS. 4 to 8, the refrigerator 20a has a higher microphone performance than the smartphone 20b. However, the smartphone 20b is closer to the user 2 than the refrigerator 20a. Thus, for sound collection, the determination unit 102 selects, as selected sensing results, the sensing results from the smartphone 20b (rather than the sensing results from the refrigerator 20a).

In addition, where image sensing (imaging) is concerned, suppose that a higher priority level is prescribed for the performance information (the second reference) of the devices 20 than for the distance between the devices 20 and the user (the first reference). In the example illustrated in FIGS. 4 to 8, the smartwatch 20c is closer to the user 2 than the refrigerator 20a. However, the built-in camera of the refrigerator 20a has a higher resolution than the built-in camera of the smartwatch 20c. Furthermore, the area of the body of the user 2 within the viewing angle of the camera in the refrigerator 20a is greater than the area of the body of the user 2 within the viewing angle of the camera in the smartwatch 20c. Thus, where imaging is concerned, the determination unit 102 selects, as selected sensing results, the sensing results from the refrigerator 20a (rather than the sensing results from the smartwatch 20c).

Note that, in order to specify the distance between each of the devices 20 and user 2, the terminal 10 is capable of using, in a composite manner, the sensing results from the plurality of devices 20. For example, terminal 10 first recognizes, on the basis of an image (in which the whole body of user 2 is seen) captured by the camera in the refrigerator 20a, that user 2 is carrying the smartphone 20b and that user 2 is wearing the smartwatch 20c. Next, terminal 10 specifies positional information of user 2 by regarding the positional information sensed by the smartphone 20b or the positional information sensed by the smartwatch 20c as the same as the positional information of user 2, for example. Further, terminal 10 specifies the distance between another device 20 (the refrigerator 20a or television receiver 20d, for example) and user 2 by calculating the difference between positional information sensed by the other device 20 and the specified positional information of user 2. Alternatively, terminal 10 may specify the distance between user 2 and the individual devices 20 in space 4 by using a well-known spatial electronics-related technique.

1-4-5. Determination of TTS Output Configuration

Thereafter, the user state estimation unit 104 of terminal 10 estimates the state of user 2 by using a plurality of selected sensing results which have been determined by the determination unit 102. Here, suppose that the state of user 2 is a "state for which notification should be emphasized".

The output control unit 106 then determines a configuration for outputting notification information to user 2 on the basis of the estimated user state. For example, terminal 10 is capable of recognizing that user 2 is singing a song on the basis of sound sensing results received from the smartphone 20b. Therefore, before outputting notification speech for the user, the output control unit 106 first determines that the output unit 124 will be made to output sound feedback at a higher volume level than normal. In addition, the output control unit 106 determines an output configuration for the speech such that the pitch of the notification speech is higher than normal, the speed (pace) of the speech is faster than normal, and the volume level of the speech is higher than normal.

Furthermore, the terminal 10 may recognize that the user is moving on the basis of captured images received from the refrigerator 20a. Therefore, the output control unit 106 determines the timing for outputting the notification speech as timing when user movement has become minimal. In addition, the terminal 10 may recognize that the user is wearing the smartphone 20b on the basis of captured images received from the refrigerator 20a, for example. Therefore, the output control unit 106 determines that the output unit 124 will be made to output the notification speech with directivity toward the position indicated by the positional information sensing results received from the smartphone 20b.

1-4-6. TTS Output

Figure 10:
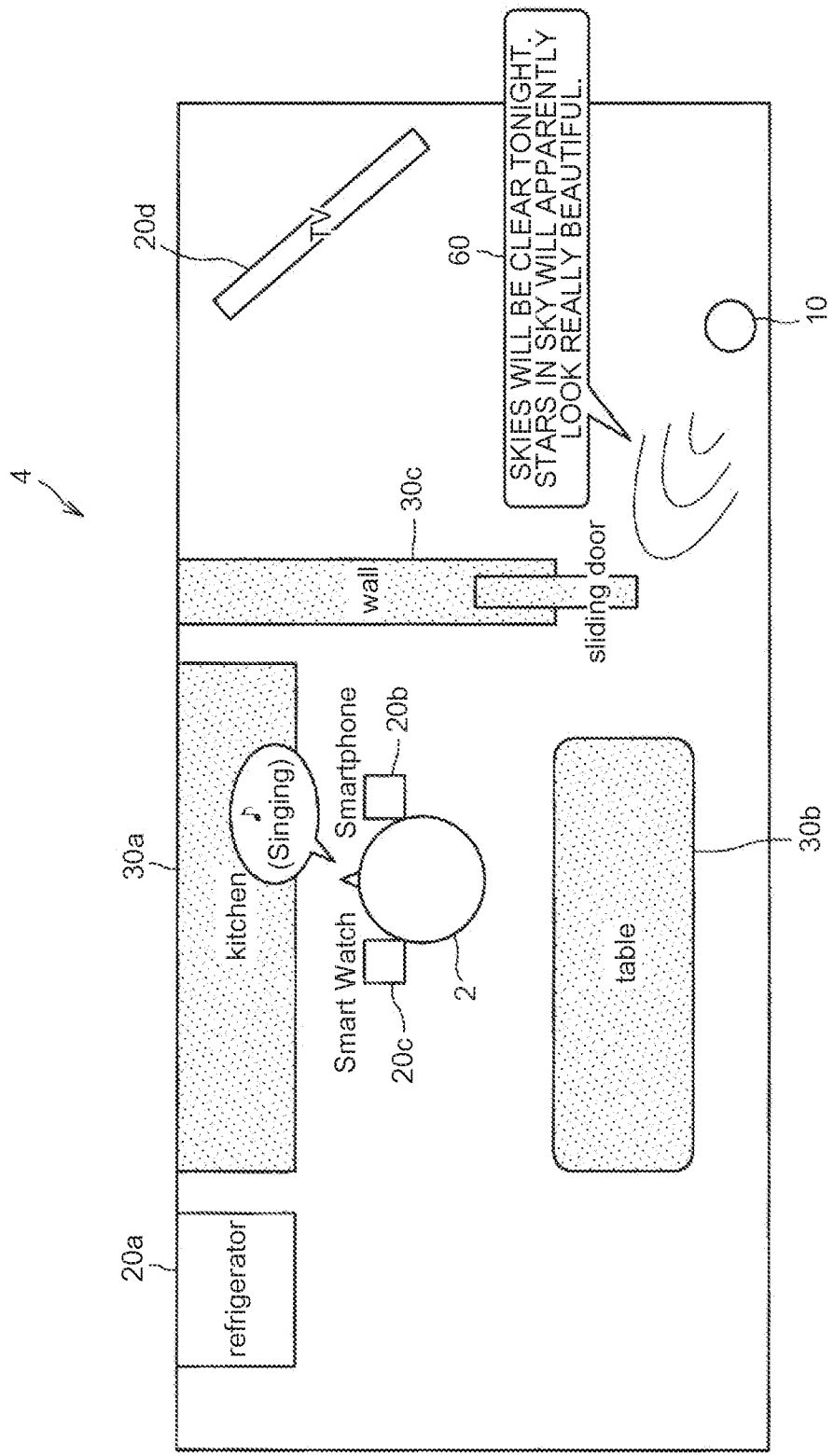
FIG. 10 is a diagram to illustrate an applied example according to the first embodiment.

Subsequently, as illustrated in FIG. 10, the output control unit 106 causes the output unit 124 to output the speech 60 of a notification like "The skies will be clear tonight . . . ", for example, on the basis of the output configuration thus determined.

1-4-7. Acquisition and Recording of Feedback from User

Figure 11:
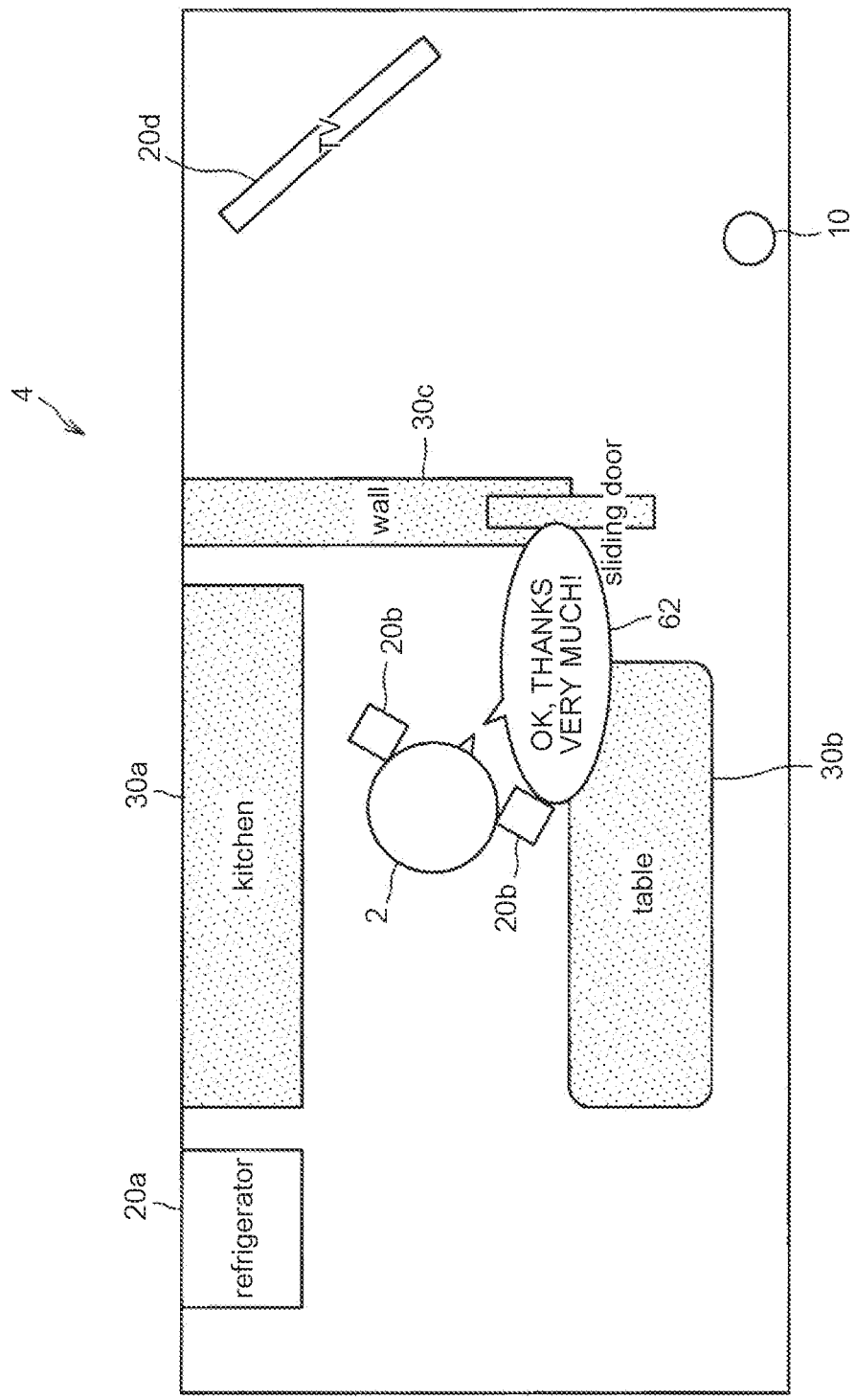
FIG. 11 is a diagram to illustrate an applied example according to the first embodiment.

Thereafter, as illustrated in FIG. 11, suppose that user 2 makes an utterance 62 of affirmative feedback, for example, in response to the output of the notification speech 60. In this case, the sensor unit 122 of terminal 10 may collect the feedback utterance 62. Alternatively, any of the devices 20 (the smartphone 20b, or the like, for example) may collect the utterance 62 and then transmit the sound collection results to the terminal 10.

Thereafter, the control unit 100 of terminal 10 performs speech recognition on the sound collection results from the sensor unit 122 or the sound collection results received from any of the devices 20, subjects the speech recognition results to natural language processing, and seeks a better understanding of intention from the results of this processing. The control unit 100 then determines, on the basis of the results of this understanding of intention, whether or not the user has indicated an affirmative evaluation of the output of the notification speech 60, and an evaluation level.

In the example illustrated in FIG. 11, the control unit 100 determines that the user has indicated an affirmative evaluation and, on the basis of the determination result, generates (determines) information indicating a user evaluation grade. Furthermore, the control unit 100 stores, in the storage unit 126, the information indicating the user evaluation grade, in association with the individual devices 20 (the refrigerator 20a and smartphone 20b) that have sensed each of the plurality of selected sensing results determined by the determination unit 102. More specifically, the control unit 100 stores, in the storage unit 126, the information indicating the user evaluation grade, in association with the fact that the device 20 that has sensed the image among the plurality of selected sensing results is the refrigerator 20*a* and that the device 20 that has sensed the speech among the plurality of selected sensing results is the smartphone 20*b*.

Figure 12:
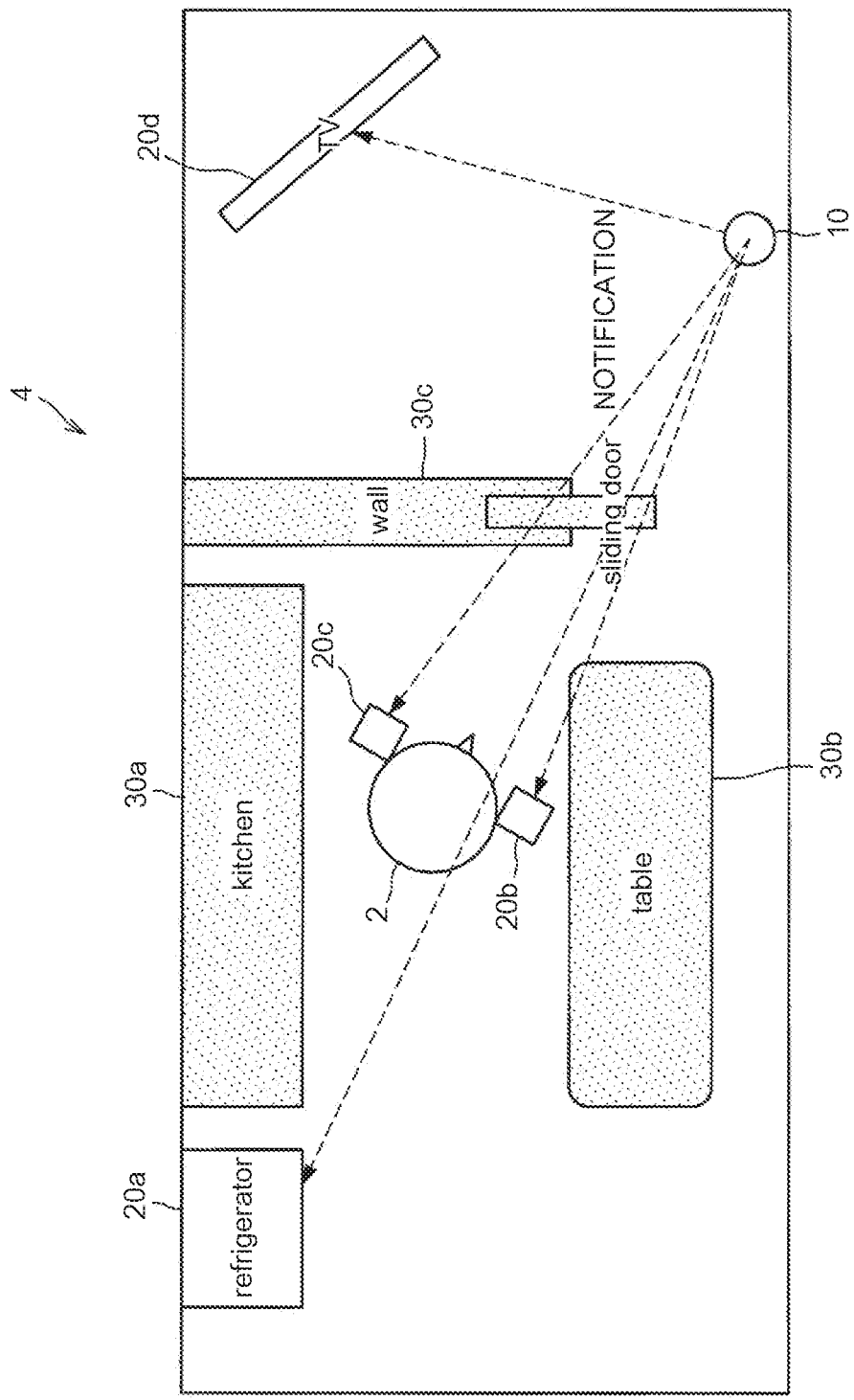
FIG. 12 is a diagram to illustrate an applied example according to the first embodiment.

In addition, as illustrated in FIG. 12, the transmission control unit 108 of terminal 10 causes the communication unit 120 to transmit, to all the devices 20, the information indicating the evaluation grade of the user, and data 54 (sometimes also called "feedback correspondence data 54" hereinbelow) which indicates correspondence with identification information of the individual devices 20 that have sensed each of the plurality of selected sensing results. Alternatively, the transmission control unit 108 may cause the communication unit 120 to transmit the information indicating the user evaluation grade only to the individual devices 20 that have sensed each of the plurality of selected sensing results. According to these examples, it is possible for the information indicating the user evaluation grade to be distributed among and stored in the plurality of devices 20 instead of the terminal 10, for example, storing all the information.

Figure 13:
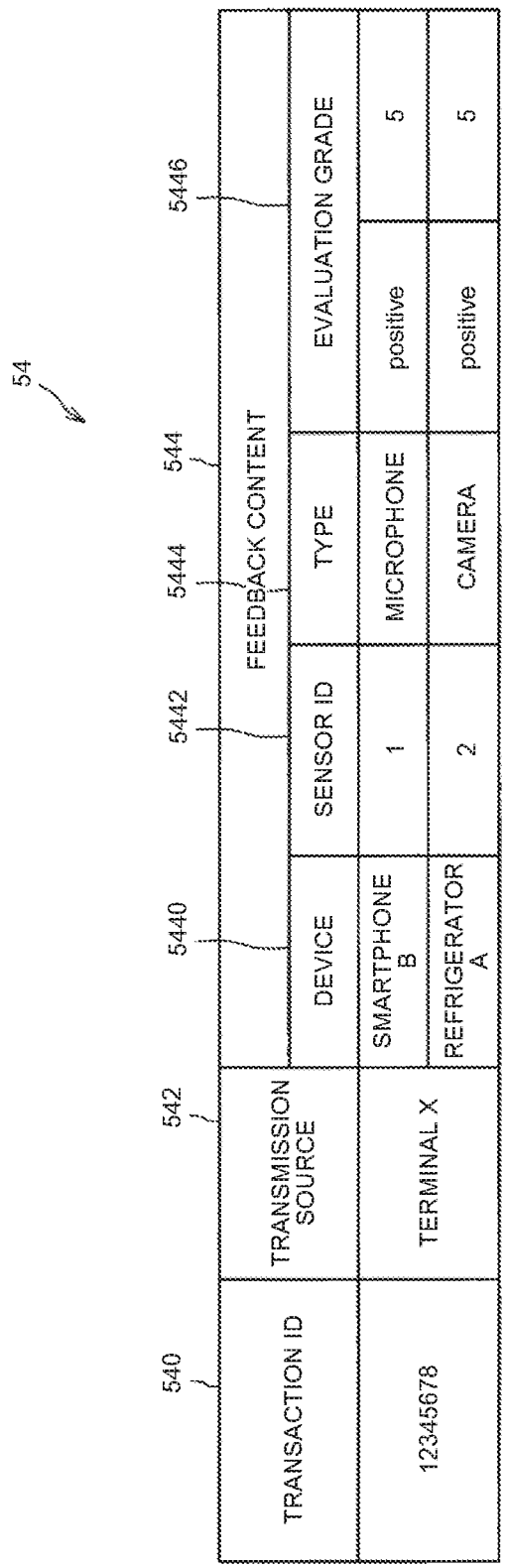
FIG. 13 is a diagram illustrating a configuration example of correspondence data for feedback from users, in an applied example according to the first embodiment.

FIG. 13 is a diagram illustrating a configuration example of the feedback correspondence data 54. As illustrated in FIG. 13, the feedback correspondence data 54 includes a transaction ID 540, a transmission source 542, and feedback content 544, for example. Here, the transmission source 542 stores identification information of terminal 10. As illustrated in FIG. 13, the feedback content 544 includes a device 5440, a sensor ID 5442, a type 5444, and an evaluation grade 5446, for example. The device 5440 records identification information of the individual devices 20 (the refrigerator 20*a* and smartphone 20*b* in the example illustrated in FIG. 13) that have sensed each of the plurality of selected sensing results. The sensor ID 5442 records an identification number (serial number) of the sensor type corresponding to the selected sensing results sensed by the device 20. The type 5444 records the type (microphone, or the like, for example) of the sensor with the ID. The evaluation grade 5446 records information indicating the user evaluation grade. In the example illustrated in FIG. 13, it can be seen that the user has made an affirmative evaluation and that the level of the affirmative evaluation is "5".

1-5. Process Flow

The configuration of the first embodiment has been described hereinabove. An example of the process flow according to the first embodiment will be described next with reference to FIGS. 14 to 19.

1-5-1. Overall Process Flow

Figure 14:
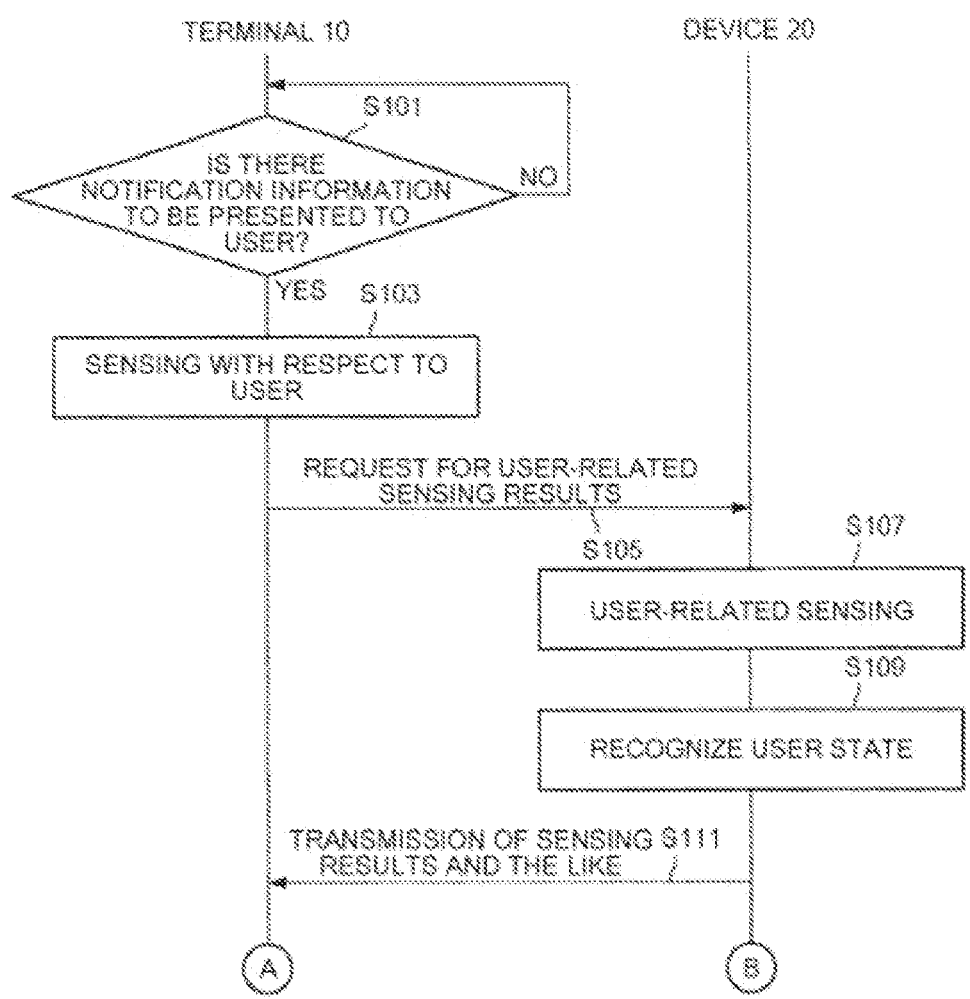
FIG. 14 is a sequence diagram illustrating a portion of a process flow according to the first embodiment.

FIG. 14 is a sequence diagram illustrating a portion of the process flow according to the first embodiment. As illustrated in FIG. 14, the control unit 100 of terminal 10 first confirms the presence or absence of notification information that is to be reported to the user within a predetermined time period (S101). While there is no notification information that is to be reported within the predetermined time period (S101: No), the control unit 100 repeats the processing of S101.

On the other hand, if notification information that is to be reported within the predetermined time period is present (S101: Yes), the control unit 100 first acquires, from the sensor unit 122, the current user-related sensing results from the sensor unit 122 (S103).

Next, under the control of the transmission control unit 108, the communication unit 120 transmits a sensing results provision request to the plurality of devices 20 in space 4 (S105).

Thereafter, the sensor unit 222 of each device 20 performs sensing with respect to the user (S107). In addition, the control unit 200 of each device 20 may recognize a user state on the basis of the sensing results in S107. For example, the control unit 200 may recognize user gestures, user emotions, the concentration level of the user, or the relaxation level of the user, and so forth, on the basis of the sensing results in S107 (S109).

Subsequently, each device 20 transmits, to terminal 10, the sensing results in S107 and the recognition results in S109 (S111).

Figure 15:
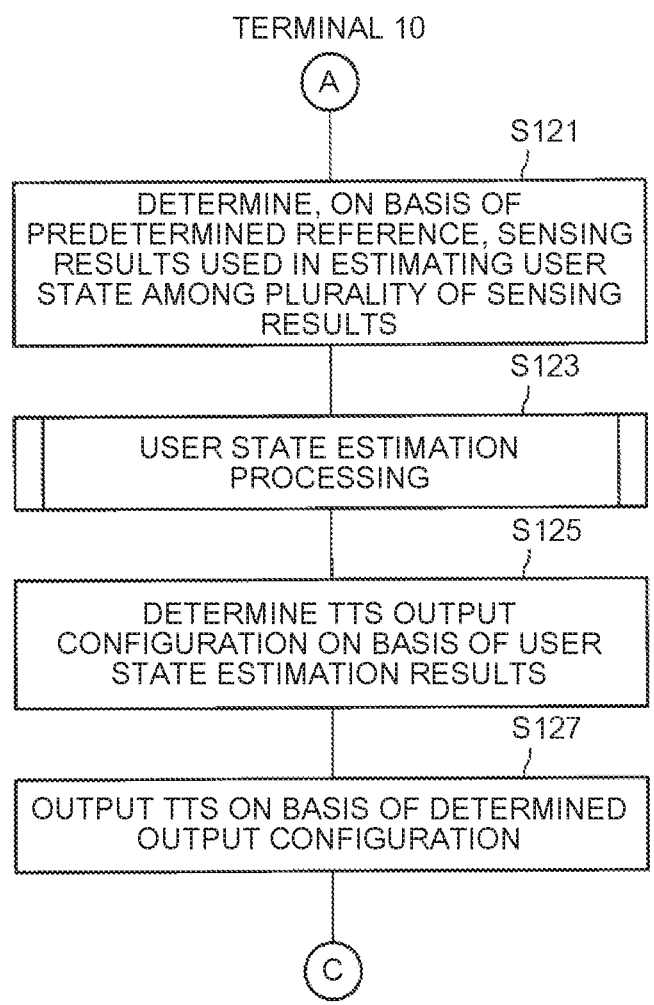
FIG. 15 is a sequence diagram illustrating a portion of the process flow according to the first embodiment.

Here, the process flow after S111 will be described with reference to FIG. 15. As illustrated in FIG. 15, after S111, the determination unit 102 of terminal 10 determines, on the basis of a predetermined reference, one or more selected sensing results used in estimating a user state from among the sensing results received from each device 20 in S111 and the sensing results from the sensor unit 122 in S103 (S121).

Next, terminal 10 performs "user state estimation processing", described subsequently (S123).

Thereafter, the output control unit 106 of terminal 10 determines, on the basis of the user state estimated in S123, an output configuration for speech (TTS, for example) that corresponds to the notification information acquired in S101 (S125). Then, the output control unit 106 causes the output unit 124 to output, on the basis of the output configuration determined in S125, the speech that corresponds to the notification information (S127).

Figure 16:
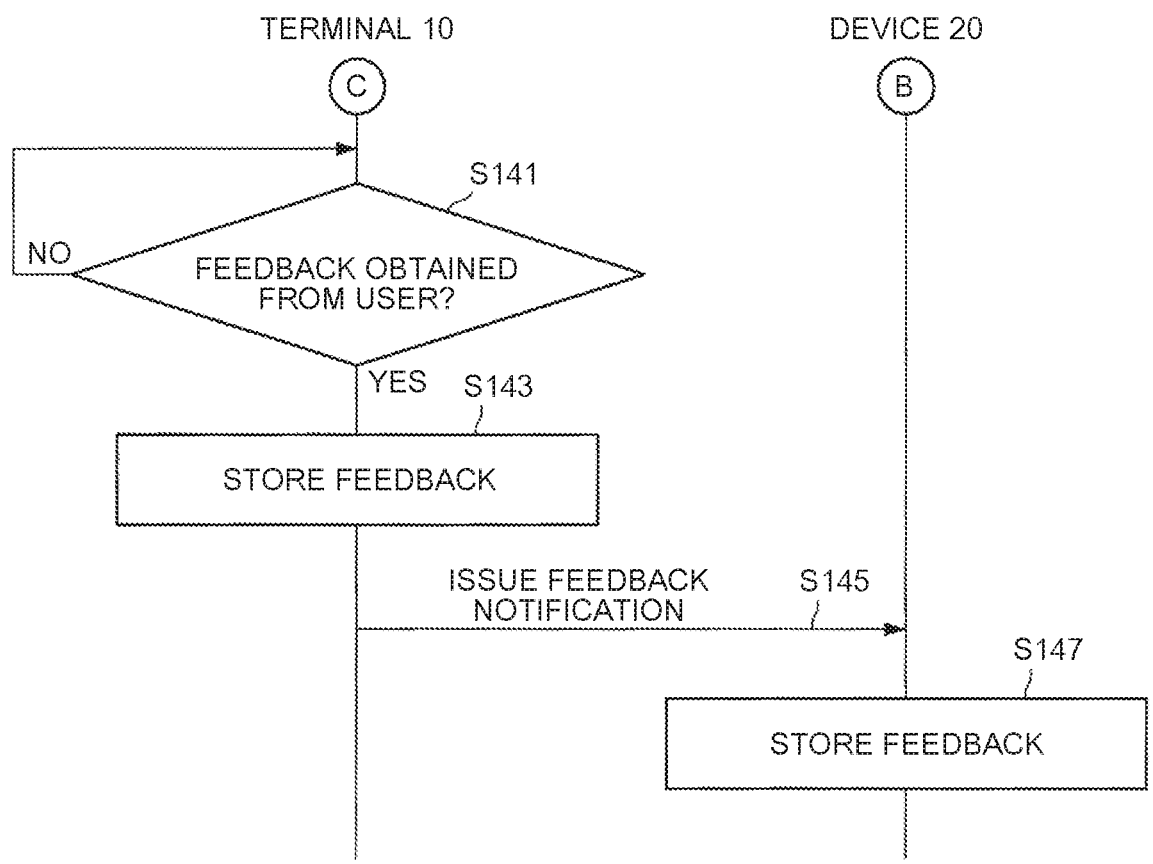
FIG. 16 is a sequence diagram illustrating a portion of the process flow according to the first embodiment.

Here, the process flow after S127 will be described with reference to FIG. 16. As illustrated in FIG. 16, the control unit 100 of terminal 10 stands by until feedback from the user and relating to the speech output in S127 is acquired as a result of being sensed by the sensor unit 122 or being received by the communication unit 120, for example (S141: No). Note that the processing may end if a predetermined time period has elapsed without feedback being obtained from the user.

On the other hand, if feedback from the user is acquired (S141: Yes), the control unit 100 determines a user evaluation grade that corresponds to the feedback by subjecting the feedback to various recognition processing (for example, speech recognition, understanding of intention, and the like). Next, the control unit 100 generates information indicating the user evaluation grade on the basis of the determination result. Then, the control unit 100 stores, in the storage unit 126, the information indicating the user evaluation grade in association with the individual devices 20 that have sensed each of the one or more selected sensing results determined in S121 (S143).

Next, under the control of the transmission control unit 108, the communication unit 120 transmits the information indicating the evaluation grade to the plurality of devices 20 in space 4. For example, the communication unit 120 may transmit the information indicating the evaluation grade only to individual devices 20 that have sensed each of the one or more selected sensing results (S145).

Thereafter, each device 20 stores the received information indicating the evaluation grade (S147).

1-5-2. User State Estimation Processing

Figure 17:
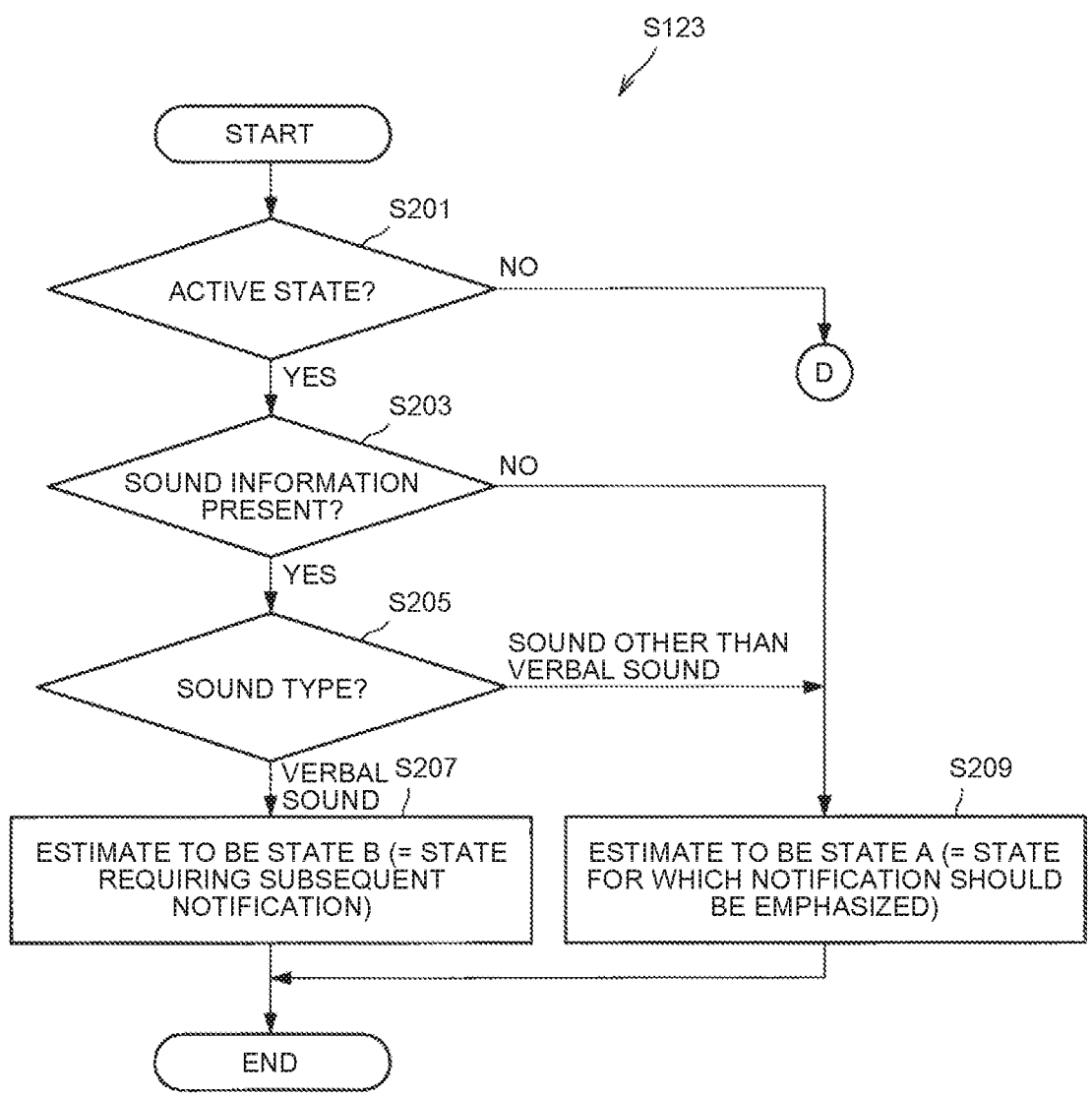
FIG. 17 is a flowchart illustrating a portion of a "user state estimation process" according to the first embodiment.
Figure 18:
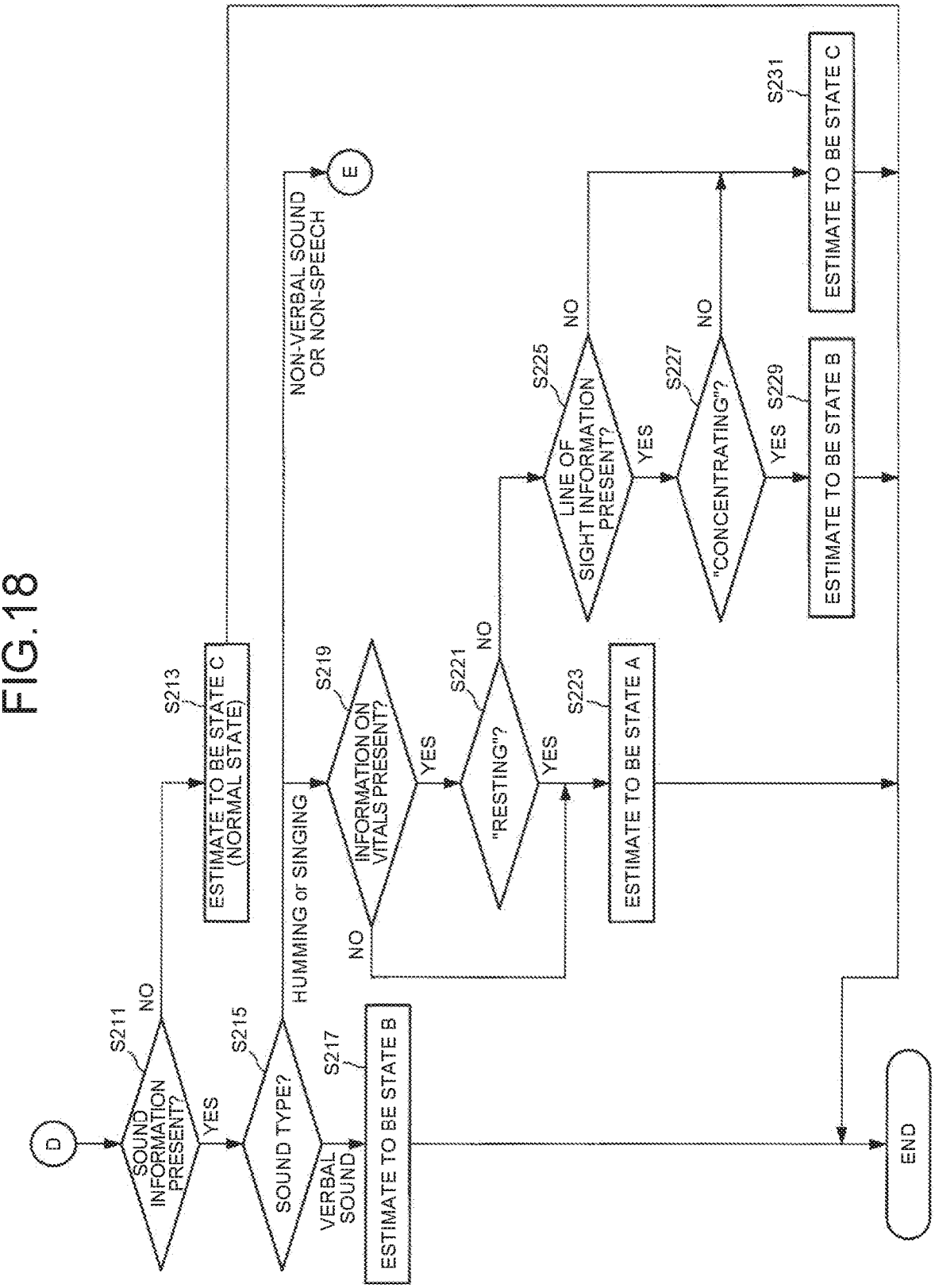
FIG. 18 is a flowchart illustrating a portion of the "user state estimation process" according to the first embodiment.
Figure 19:
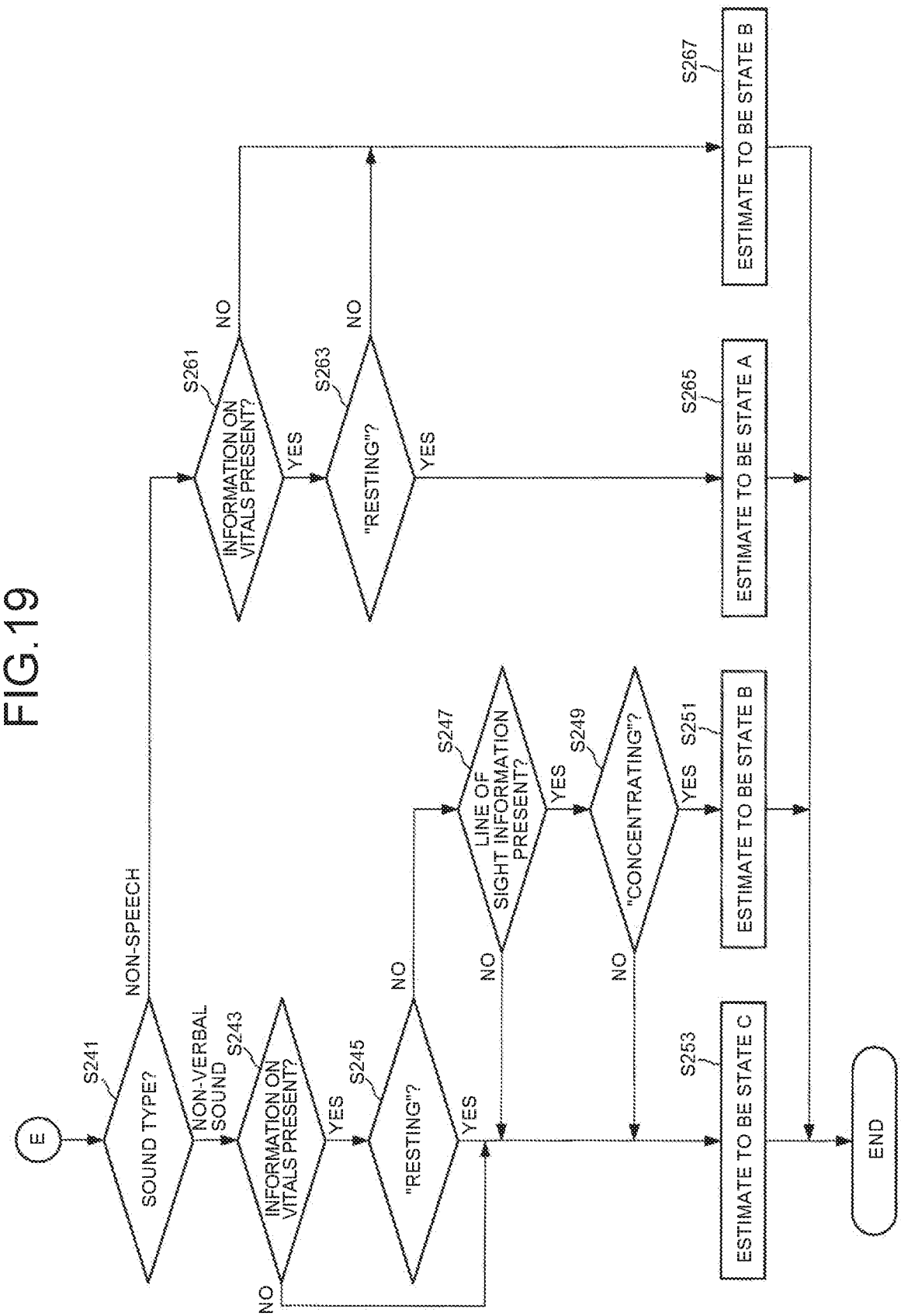
FIG. 19 is a flowchart illustrating a portion of the "user state estimation process" according to the first embodiment.

Here, an example of the flow of the "user state estimation processing" in S123 will be described with reference to FIGS. 17 to 19. As illustrated in FIG. 17, the user state estimation unit 104 of terminal 10 first determines whether or not the user is in an active state on the basis of each of the one or more selected sensing results determined in S121 (S201).

If it is determined that the user is in an active state (S201: Yes), the user state estimation unit 104 then determines whether or not sensing results for sound made by the user are included among the one or more selected sensing results (S203). If sensing results for sound made by the user are included (S203: Yes), the user state estimation unit 104 then uses the sound sensing results to determine the type of sound made by the user (S205). If it is determined that the type of sound made by the user is "verbal sound", the user state estimation unit 104 estimates the user state to be a "state requiring subsequent notification" (called "state B" hereinbelow) (S207). On the other hand, if the type of sound made by the user is a sound other than a "verbal sound" (more specifically, humming, singing, non-verbal sounds, or non-speech sounds), the user state estimation unit 104 estimates the user state to be a "state for which notification should be emphasized" (called "state A" hereinbelow) (S209).

On the other hand, if it is determined in S203 that sensing results for sound made by the user are not included among the one or more selected sensing results (S203: No), the user state estimation unit 104 then estimates the user state to be "state A" (S209).

Here, the process flow in a case where it is determined in S201 that the user is not in an active state (that is, in an inactive state) (S201: No) will be described with reference to FIG. 18. As illustrated in FIG. 18, the user state estimation unit 104 first determines whether or not sensing results for sound made by the user are included among the one or more selected sensing results (S211). If sensing results for sound made by the user are not included among the one or more selected sensing results (S211: No), the user state estimation unit 104 estimates the user state to be a "normal state" (called "state C" hereinbelow) (S213).

On the other hand, if sensing results for sound made by the user are included among the one or more selected sensing results (S211: Yes), the user state estimation unit 104 then uses the sound sensing results to determine the type of sound made by the user (S215). If the type of sound made by the user is determined as being "verbal sound", the user state estimation unit 104 estimates the user state to be "state B" (S217).

On the other hand, if it is determined that the type of sound made by the user is "humming" or "singing", the user state estimation unit 104 then determines whether or not sensing results for information on the vitals of the user are included among the one or more selected sensing results (S219). If sensing results for information on the vitals of the user are not included among the one or more selected sensing results (S219: No), the user state estimation unit 104 estimates the user state to be "state A" (S223).

On the other hand, if sensing results for information on the vitals of the user are included among the one or more selected sensing results (S219: Yes), the user state estimation unit 104 then uses the sensing results for information on the vitals of the user to determine whether or not the user is "resting" (S221). If it is determined that the user is "resting" (S221: Yes), the user state estimation unit 104 estimates the user state to be "state A" (S223).

On the other hand, if it is determined that the user is "not resting" (S221: No), the user state estimation unit 104 then determines whether or not sensing results for the line of sight of the user are included among the one or more selected sensing results (S225). If sensing results for the line of sight of the user are not included among the one or more selected sensing results (S225: No), the user state estimation unit 104 estimates the user state to be "state C" (S231).

On the other hand, if sensing results for the line of sight of the user are included among the one or more selected sensing results (S225: Yes), the user state estimation unit 104 then uses the sensing results for the line of sight of the user to determine whether or not the user is "concentrating" (S227). If it is determined that the user is "concentrating" (S227: Yes), the user state estimation unit 104 estimates the user state to be "state B" (S229).

On the other hand, if it is determined that the user is "not concentrating" (S227: No), the user state estimation unit 104 estimates the user state to be "state C" (S231).

Here, the process flow in a case where it is determined in S215 that the type of sound made by the user is a "non-verbal sound" or "non-speech" will be described with reference to FIG. 19. As illustrated in FIG. 19, if it is determined in S215 that the type of sound made by the user is a "non-verbal sound", the user state estimation unit 104 first determines whether or not sensing results for information on the vitals of the user are included among the one or more selected sensing results (S243). If sensing results for information on the vitals of the user are not included among the one or more selected sensing results (S243: No), the user state estimation unit 104 estimates the user state to be "state C" (S253).

On the other hand, if sensing results for information on the vitals of the user are included among the one or more selected sensing results (S243: Yes), the user state estimation unit 104 then uses the sensing results for information on the vitals of the user to determine whether or not the user is "resting" (S245). If it is determined that the user is "resting" (S245: Yes), the user state estimation unit 104 estimates the user state to be "state C" (S253).

On the other hand, if it is determined that the user is "not resting" (S245: No), the user state estimation unit 104 then determines whether or not sensing results for the line of sight of the user are included among the one or more selected sensing results (S247). If sensing results for the line of sight of the user are not included among the one or more selected sensing results (S247: No), the user state estimation unit 104 estimates the user state to be "state C" (S253).

On the other hand, if sensing results for the line of sight of the user are included among the one or more selected sensing results (S247: Yes), the user state estimation unit 104 then uses the sensing results for the line of sight of the user to determine whether or not the user is "concentrating" (S249). If it is determined that the user is "concentrating" (S249: Yes), the user state estimation unit 104 estimates the user state to be "state B" (S251). On the other hand, if it is determined that the user is "not concentrating" (S249: No), the user state estimation unit 104 estimates the user state to be "state C" (S253).

On the other hand, if it is determined in S215 that the type of sound made by the user is "non-speech", the user state estimation unit 104 first determines whether or not sensing results for information on the vitals of the user are included among the one or more selected sensing results (S261). If sensing results for information on the vitals of the user are not included among the one or more selected sensing results (S261: No), the user state estimation unit 104 estimates the user state to be "state B" (S267).

On the other hand, if sensing results for information on the vitals of the user are included among the one or more selected sensing results (S261: Yes), the user state estimation unit 104 then uses the sensing results for information on the vitals of the user to determine whether or not the user is "resting" (S263). If it is determined that the user is "resting" (S263: Yes), the user state estimation unit 104 estimates the user state to be "state A" (S265).

On the other hand, if it is determined that the user is "not resting" (S263: No), the user state estimation unit 104 estimates the user state to be "state B" (S267).

1-6. Advantageous Effects

As described hereinabove, the terminal 10 according to the first embodiment determines, on the basis of a predetermined reference, one or more selected sensing results used in estimating a user state from among a plurality of sensing results received from a plurality of devices 20, and controls an output of information on the basis of the one or more selected sensing results. Hence, sensing results which are used in estimating a user state can be suitably determined. As a result, the accuracy of user state estimation can be improved. Accordingly, when information is output to a user, it is possible to output information in a suitable form according to the state of the user.

For example, if the user-related sensing by terminal 10 is impossible or difficult, terminal 10 is capable of determining, on the basis of the predetermined reference, the one or more selected sensing results from among the plurality of user-related sensing results received from the plurality of devices 20. Hence, even in a situation where sensing with respect to user 2 by terminal 10 is difficult, for example, it is possible to output information such as the speech of a notification to the user, for example, by means of an output configuration which is suitable for the user state. Consequently, the content of this information may be adequately relayed to the user.

1-7. Specific Example

Next, a specific example of the foregoing user state estimation by the user state estimation unit 104 will be described in "1-7-1. Specific example 1" to "1-7-4. Specific example 4".

1-7-1. Specific Example 1

Figure 20:
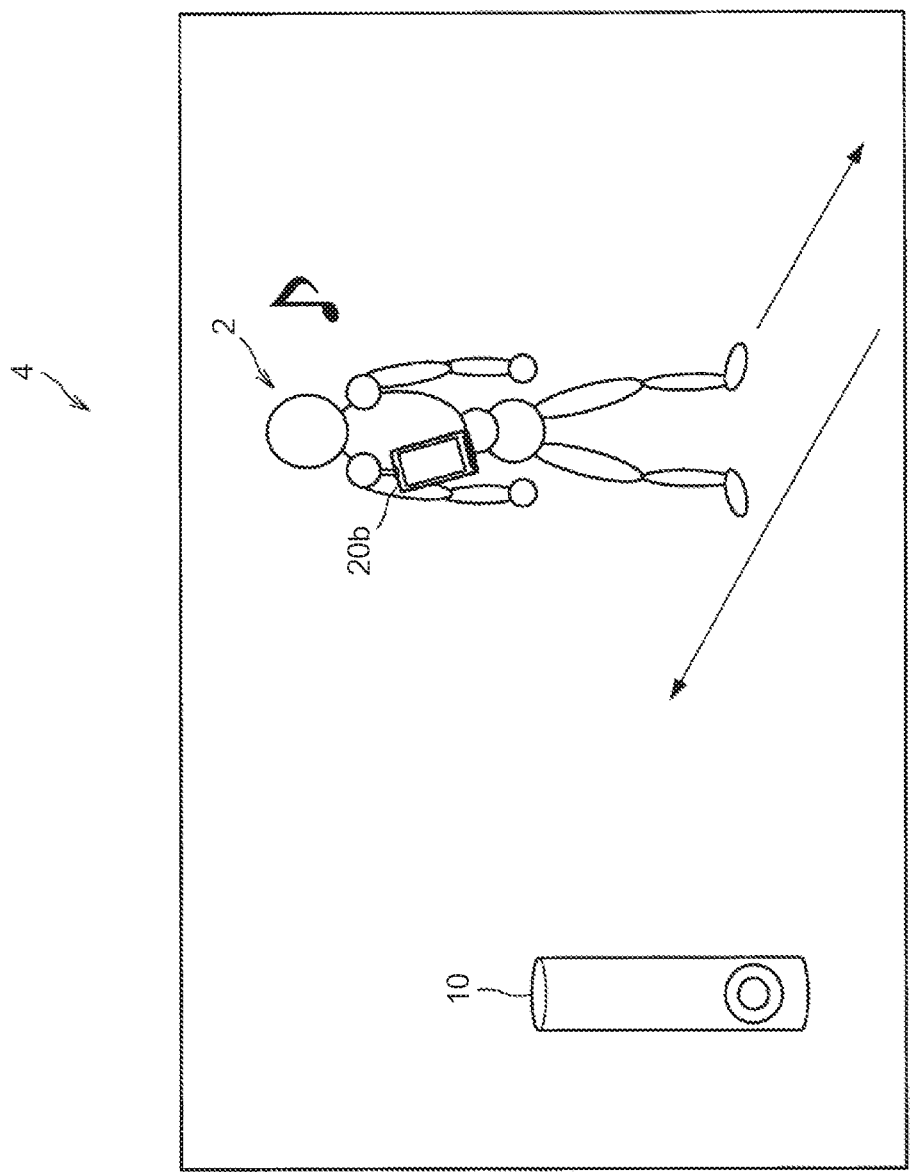
FIG. 20 is a diagram to illustrate a specific example of user state estimation.

First, a specific example 1 will be described with reference to FIG. 20. As illustrated in FIG. 20, in specific example 1, it is assumed that user 2 goes back and forth inside space 4 while holding (inserted in their pocket, or the like, for example) the smartphone 20b. For example, user 2 is cleaning inside space 4. Furthermore, it is assumed that user 2 is humming a tune. The smartphone 20b has a built-in acceleration sensor and microphone.

In the example illustrated in FIG. 20, the terminal 10 first receives, from the smartphone 20b, acceleration sensing results from the acceleration sensor and sound collection results from the microphone, of the smartphone 20b. Next, the terminal 10 recognizes, on the basis of the received acceleration sensing results, that the user is moving a lot and recognizes, on the basis of the recognition results, that user 2 is in an active state. In addition, the terminal 10 recognizes that the user is humming a tune on the basis of the received sound collection results. Furthermore, the terminal 10 estimates that user 2 is in "state A (=a state for which notification should be emphasized)" based on the fact that user 2 is in an active state and humming a tune.

1-7-2. Specific Example 2

Figure 21:
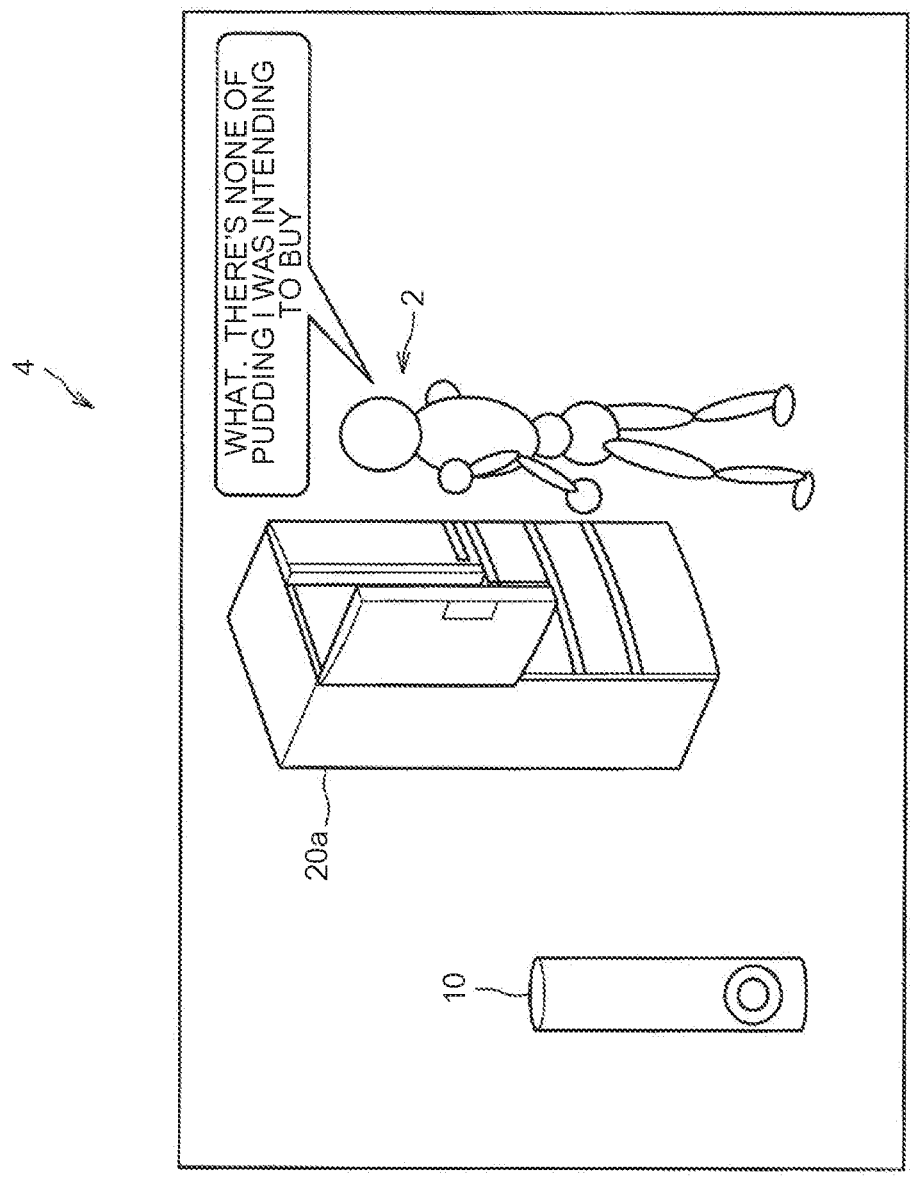
FIG. 21 is a diagram to illustrate a specific example of user state estimation.

Next, a specific example 2 will be described with reference to FIG. 21. As illustrated in FIG. 21, in specific example 2, it is assumed that user 2 is talking to themselves and saying something like "What. There's none of the pudding I was intending to buy" while looking inside the refrigerator 20a, for example. Suppose that the refrigerator 20a has a built-in camera and microphone.

In the example illustrated in FIG. 21, terminal 10 receives, from the refrigerator 20a, captured images from the camera and sound collection results from the microphone, of the refrigerator 20a. Next, terminal 10 recognizes, on the basis of the received captured images, that user 2 is barely moving and recognizes, on the basis of the recognition results, that user 2 is in an inactive state. Furthermore, terminal 10 recognizes that user 2 is making a verbal sound on the basis of the received sound collection results. Then, terminal 10 estimates that user 2 is in "state B (=a state requiring subsequent notification)" based on the fact that user 2 is in an inactive state and making a verbal sound.

1-7-3. Specific Example 3

Figure 22:
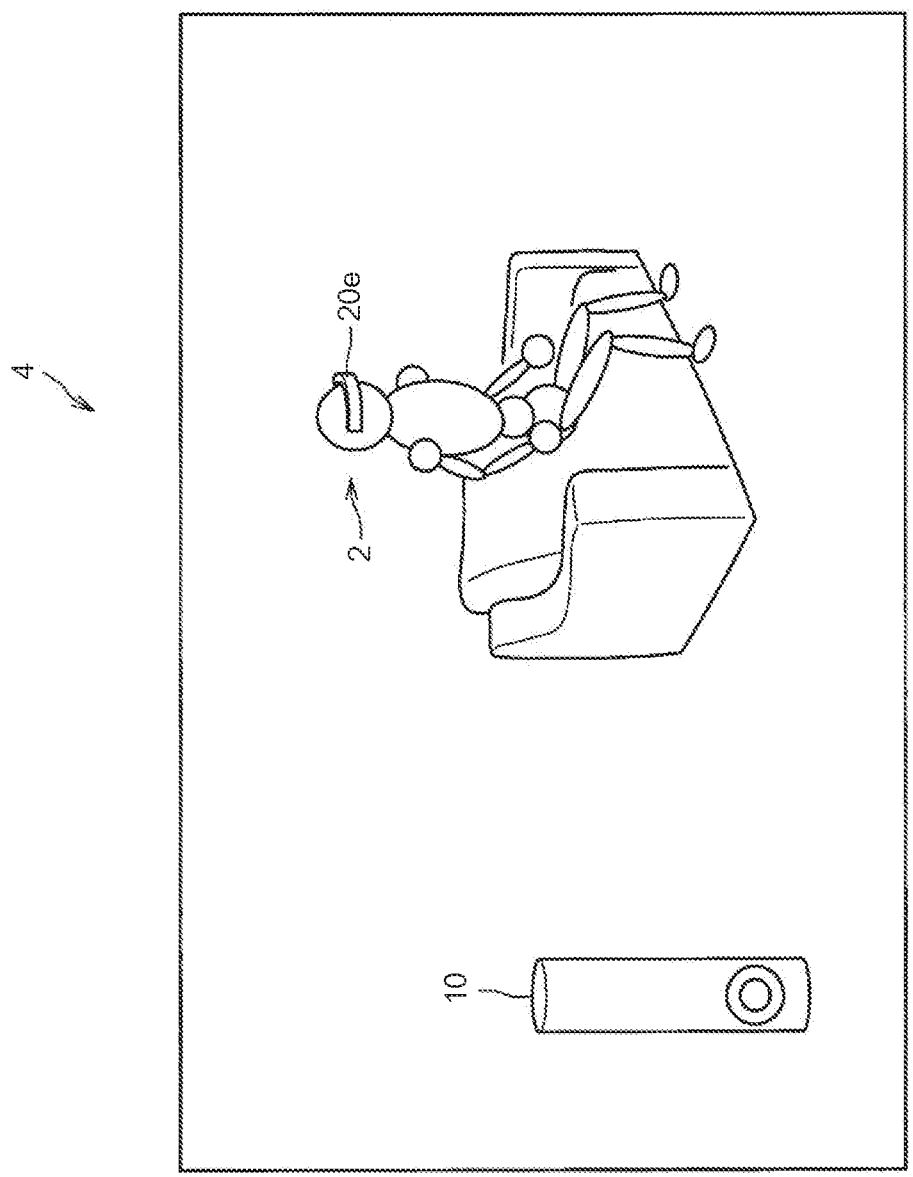
FIG. 22 is a diagram to illustrate a specific example of user state estimation.

Next, a specific example 3 will be described with reference to FIG. 22. As illustrated in FIG. 22, in specific example 3, it is assumed that user 2 is sitting on the sofa wearing eyewear 20e. In addition, user 2 is concentrating on viewing Augmented Reality (AR) content through the eyewear 20e and having fun. User 2 is laughing excitedly, for example. Suppose that the eyewear 20e has a built-in acceleration sensor, brain wave sensor, microphone, and line-of-sight sensor.

In the example illustrated in FIG. 21, the terminal 10 receives, from the eyewear 20e, acceleration sensing results from the acceleration sensor, brain wave sensing results from the brain wave sensor, sound collection results from the microphone, and line-of-sight sensing results from the line-of-sight sensor, of the eyewear 20e. Next, the terminal 10 recognizes, on the basis of the received acceleration sensing results, that user 2 is barely moving and recognizes, on the basis of the recognition results, that user 2 is in an inactive state. Furthermore, the terminal 10 recognizes that user is making a non-verbal sound (laughter or the like) on the basis of the received sound collection results. In addition, the terminal 10 recognizes, on the basis of the received brain wave sensing results, that brain waves are active and recognizes, on the basis of the recognition results, that user 2 is "not resting". Furthermore, the terminal 10 recognizes, on the basis of the received line-of-sight sensing results, that the frequency of blinks of user 2 is low and recognizes, on the basis of the recognition results, that the concentration level of user 2 is equal to or greater than a predetermined threshold value. The terminal 10 then estimates that user 2 is in "state B" based on the fact that the user 2 is in an inactive state, making a non-verbal sound, and "concentrating without resting".

1-7-4. Specific Example 4

Figure 23:
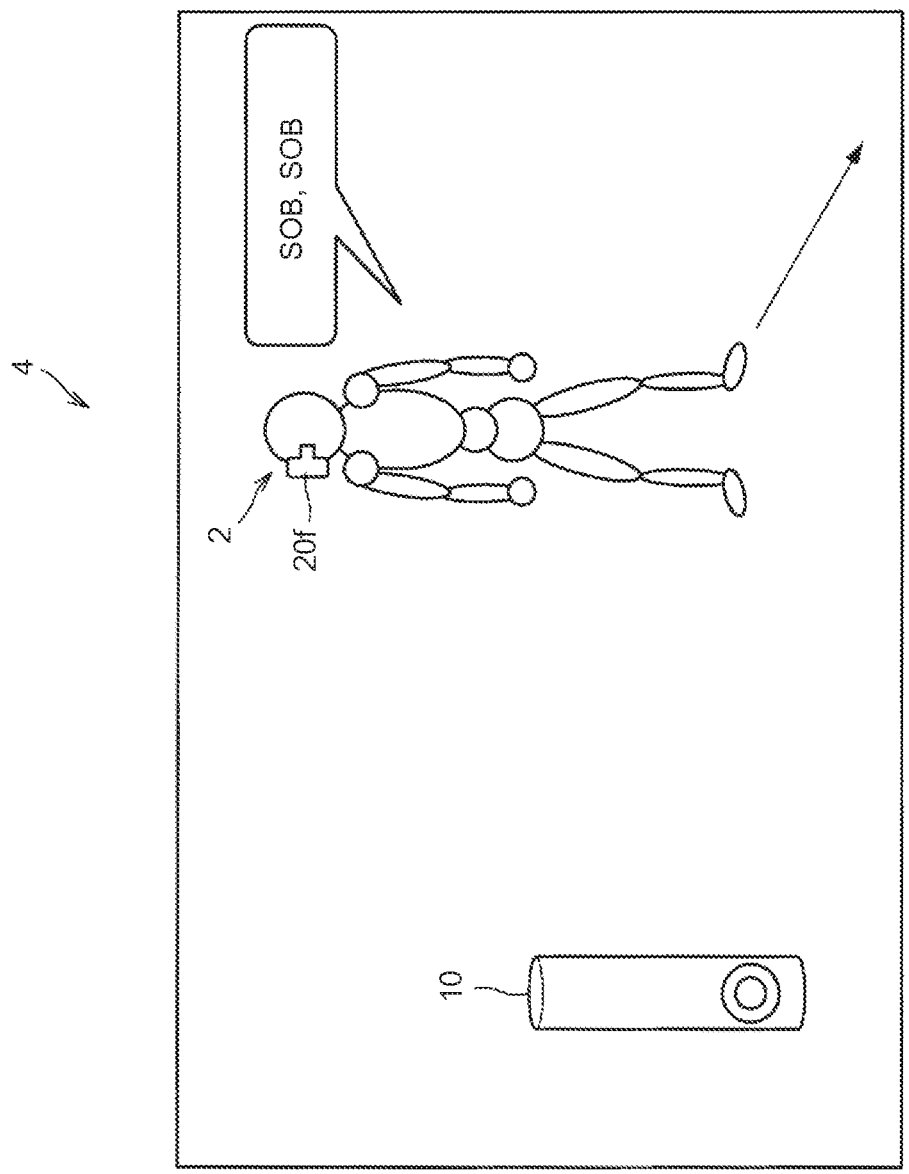
FIG. 23 is a diagram to illustrate a specific example of user state estimation.

Next, a specific example 4 will be described with reference to FIG. 23. As illustrated in FIG. 23, in specific example 4, it is assumed that user 2 is crying from a sobbing sound or the like, for example, while walking in an office corridor 4 and wearing an open-ear device 20f (for example, an earphone-type apparatus or a neck-mounted loudspeaker, or the like). Suppose that the open-ear device 20f has a built-in acceleration sensor and microphone. The open-ear device 20*f* may also have a speech output unit.

In the example illustrated in FIG. 23, terminal 10 receives, from the open-ear device 20*f*, acceleration sensing results from the acceleration sensor and sound collection results from the microphone, of the open-ear device 20*f*. Next, the terminal 10 recognizes, on the basis of the received acceleration sensing results, that user 2 is moving a lot and recognizes, on the basis of the recognition results, that user 2 is in an active state. Furthermore, the terminal 10 recognizes that user 2 is making a non-verbal sound (a crying sound or the like) on the basis of the received sound collection results. The terminal 10 then estimates that user 2 is in "state A" based on the fact that user 2 is in an active state and making a non-verbal sound.

2. Second Embodiment

The first embodiment has been described hereinabove. A second embodiment will be described next. As will be described subsequently, according to the second embodiment, the server 70 is capable of determining, on the basis of the predetermined reference, one or more selected sensing results (which are used in estimating a user state) from among a plurality of sensing results that the terminal 10 has received from a plurality of devices 20 in space 4. The content of the second embodiment will be described sequentially in detail hereinbelow. Only content that differs from the first embodiment will be described hereinbelow, and descriptions of identical content will be omitted.

2-1. System Configuration

Figure 24:
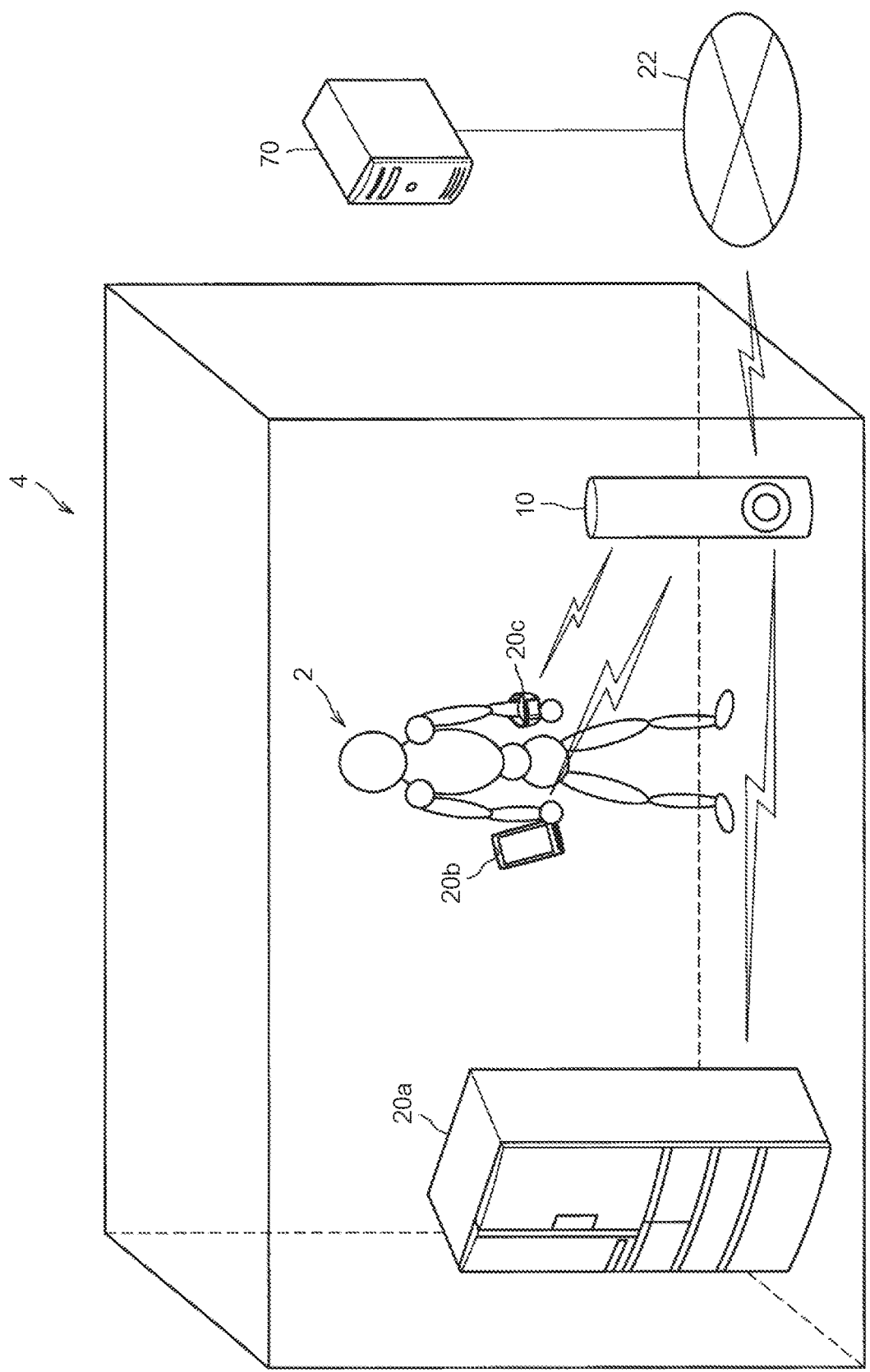
FIG. 24 is an explanatory diagram illustrating a configuration example of an information processing system according to a second embodiment of the present disclosure.

First, a configuration example of an information processing system according to the second embodiment will be described with reference to FIG. 24. As illustrated in FIG. 24, in comparison with the first embodiment illustrated in FIG. 1, the information processing system according to the second embodiment further includes a communications network 22 and a server 70.

2-1-1. Communications Network 22

The communications network 22 is a wired or wireless transmission line for information transmitted from apparatuses connected to the communications network 22. For example, the communications network 22 may also include a public line such as a telephone network, the internet, or a satellite communications network, and various Local Area Networks (LAN) including Ethernet (registered trademark), and Wide Area Networks (WAN), or the like. Furthermore, the communications network 22 may also include a dedicated line such as an Internet Protocol-Virtual Private Network (IP-VPN).

2-1-2. Server 70

The server 70 is an example of the information processing apparatus according to the present disclosure. The server 70 controls outputs of various information (for example, speech, video, or music, and the like) to terminal 10 via the communications network 22. For example, the server 70 causes the terminal 10 to output speech that corresponds to predetermined notification information of a predetermined application service. Alternatively, the server 70 may cause the terminal 10 to output speech of an interaction with user 2, of a predetermined application service.

2-2. Configuration: Terminal 10

Figure 25:
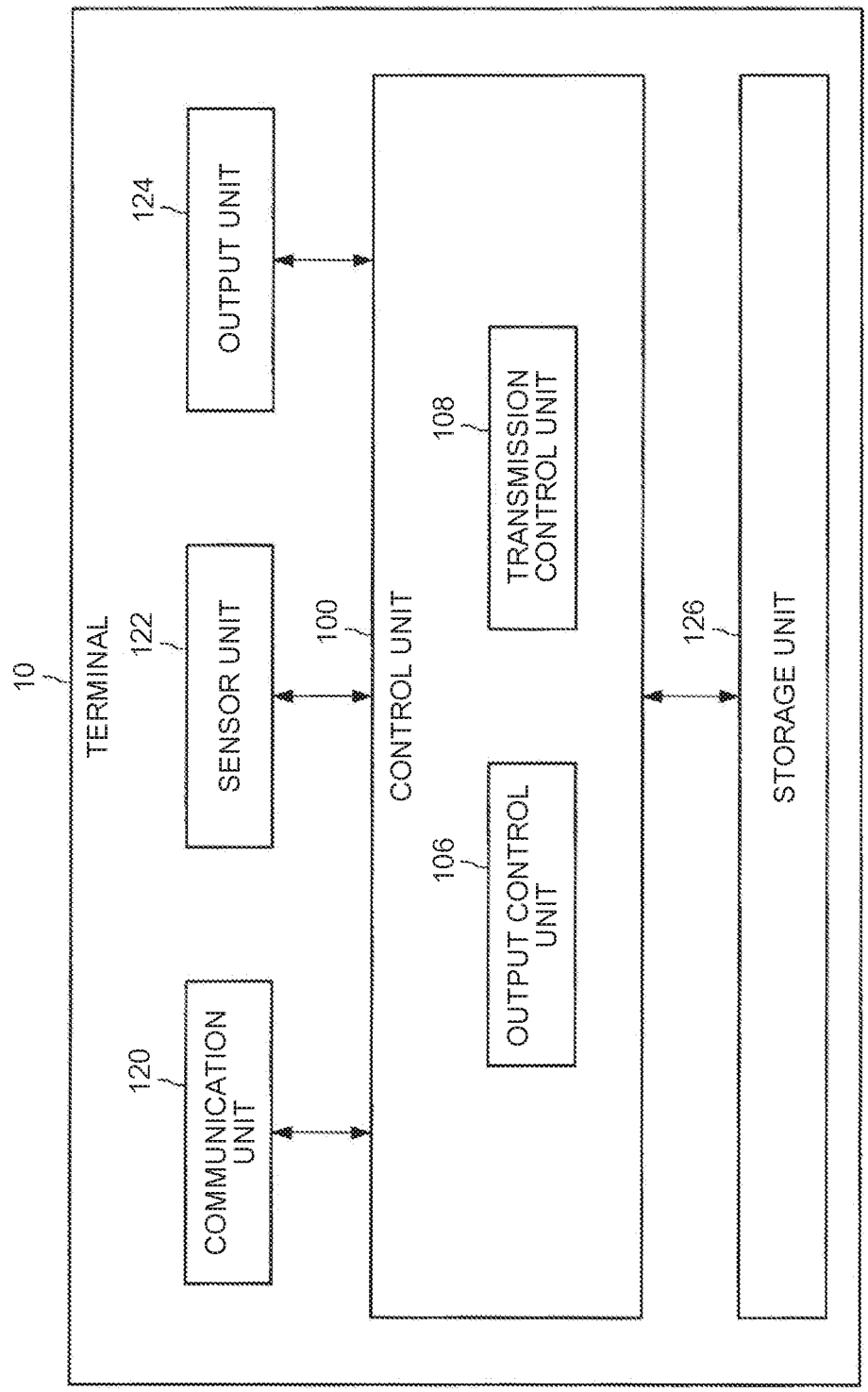
FIG. 25 is a functional block diagram illustrating a configuration example of the terminal 10 according to the second embodiment.

The configuration of the information processing system according to the second embodiment has been described hereinabove. The configuration according to the second embodiment will be described next. FIG. 25 is a functional block diagram illustrating a configuration example of the terminal 10 according to the second embodiment. As illustrated in FIG. 25, in comparison with the first embodiment illustrated in FIG. 3, the terminal 10 does not have the determination unit 102 or the user state estimation unit 104. Only constituent elements with functions that differ from the first embodiment will be described hereinbelow.

2-2-1. Output Control Unit 106

The output control unit 106 according to the second embodiment controls, on the basis of control information received from the server 70, the output of various information (for example, speech (TTS and the like), video, or music, or the like) by the output unit 124. For example, the output control unit 106 causes the output unit 124 to output, with timing designated by control information received from the server 70, information of types designated by the control information.

Alternatively, the output control unit 106 may cause the output unit 124 to output, on the basis of the control information received from the server 70, the video or speech itself, received from the server 70, for example, or speech and the like that corresponds to the information received from the server 70 (notification information and the like for the user, for example).

2-3. Configuration: Server 70

Figure 26:
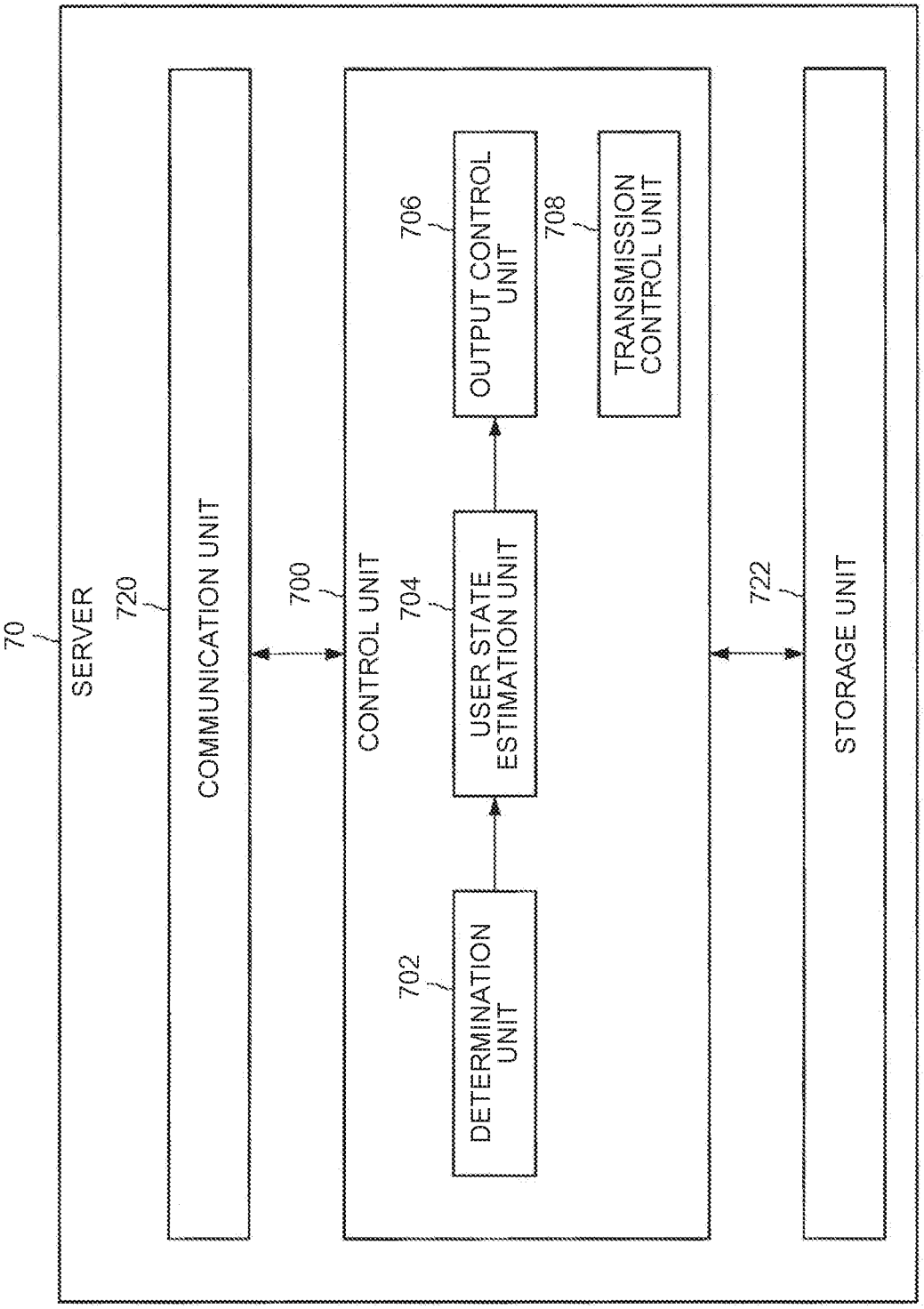
FIG. 26 is a functional block diagram illustrating a configuration example of a server 70 according to the second embodiment.

A configuration example of the server 70 according to the second embodiment will be described next. FIG. 26 is a functional block diagram illustrating a configuration example of the server 70 according to the second embodiment. As illustrated in FIG. 26, the server 70 has a control unit 700, a communication unit 720, and a storage unit 722.

2-3-1. Control Unit 700

The control unit 700 may be configured to include processing circuits such as a CPU 150, described subsequently, and a GPU, or the like, for example. The control unit 700 integrally controls the operations of the server 70. In addition, as illustrated in FIG. 26, the control unit 700 has a determination unit 702, a user state estimation unit 704, an output control unit 706, and a transmission control unit 708.

2-3-2. Determination Unit 702

The determination unit 702 determines, on the basis of the predetermined reference, (the foregoing) one or more selected sensing results from among a plurality of sensing results from a plurality of devices 20 in space 4 and received via the terminal 10, and sensing results from the terminal 10. Alternatively, the determination unit 702 may determine, on the basis of the predetermined reference, the one or more selected sensing results only from among the plurality of sensing results from the plurality of devices 20 and received via the terminal 10.

Note that the specific content of the determination by the determination unit 702 is substantially the same as for the determination unit 102 according to the first embodiment.

2-3-3. User State Estimation Unit 704

The user state estimation unit 704 estimates a state of a user (a target user, for example) by using one or more selected sensing results which have been determined by the determination unit 702. Note that the specific content of the estimation by the user state estimation unit 704 is substantially the same as for the user state estimation unit 104 according to the first embodiment.

2-3-4. Output Control Unit 706

The output control unit 706 controls information outputs by the terminal 10. For example, the output control unit 706 first generates control information to cause the terminal 10 to output information such as notification information for the user, for example, on the basis of a user state estimated by the user state estimation unit 704. The output control unit 706 then causes the communication unit 720 to transmit the generated control information to the terminal 10.

Note that a portion of the content of the specific output control by the output control unit 706 may be substantially the same as for the output control unit 106 according to the first embodiment.

2-3-5. Transmission Control Unit 708

The transmission control unit 708 controls the transmission of various information to other apparatuses. For example, the transmission control unit 708 may cause the communication unit 120 to transmit, to a plurality of devices 20 in space 4, information indicating the evaluation grade obtained from the user with respect to an output of information after the information has been output by the terminal 10. Alternatively, the transmission control unit 708 may generate control information for transmitting the information indicating the evaluation grade to the plurality of devices 20 and cause the communication unit 720 to transmit the control information to the terminal 10.

2-3-6. Communication Unit 720

The communication unit 720 may be configured to include communication apparatus 166, described subsequently, for example. The communication unit 720 sends and receives information to and from other apparatuses via the communications network 22, for example.

2-3-7. Storage Unit 722

The storage unit 722 may be configured to include storage apparatus 164, described subsequently, for example. The storage unit 722 stores various data and various software.

2.4. Process Flow

The configuration of the second embodiment has been described hereinabove. An example of the process flow according to the second embodiment will be described next with reference to FIGS. 27 and 28.

Figure 27:
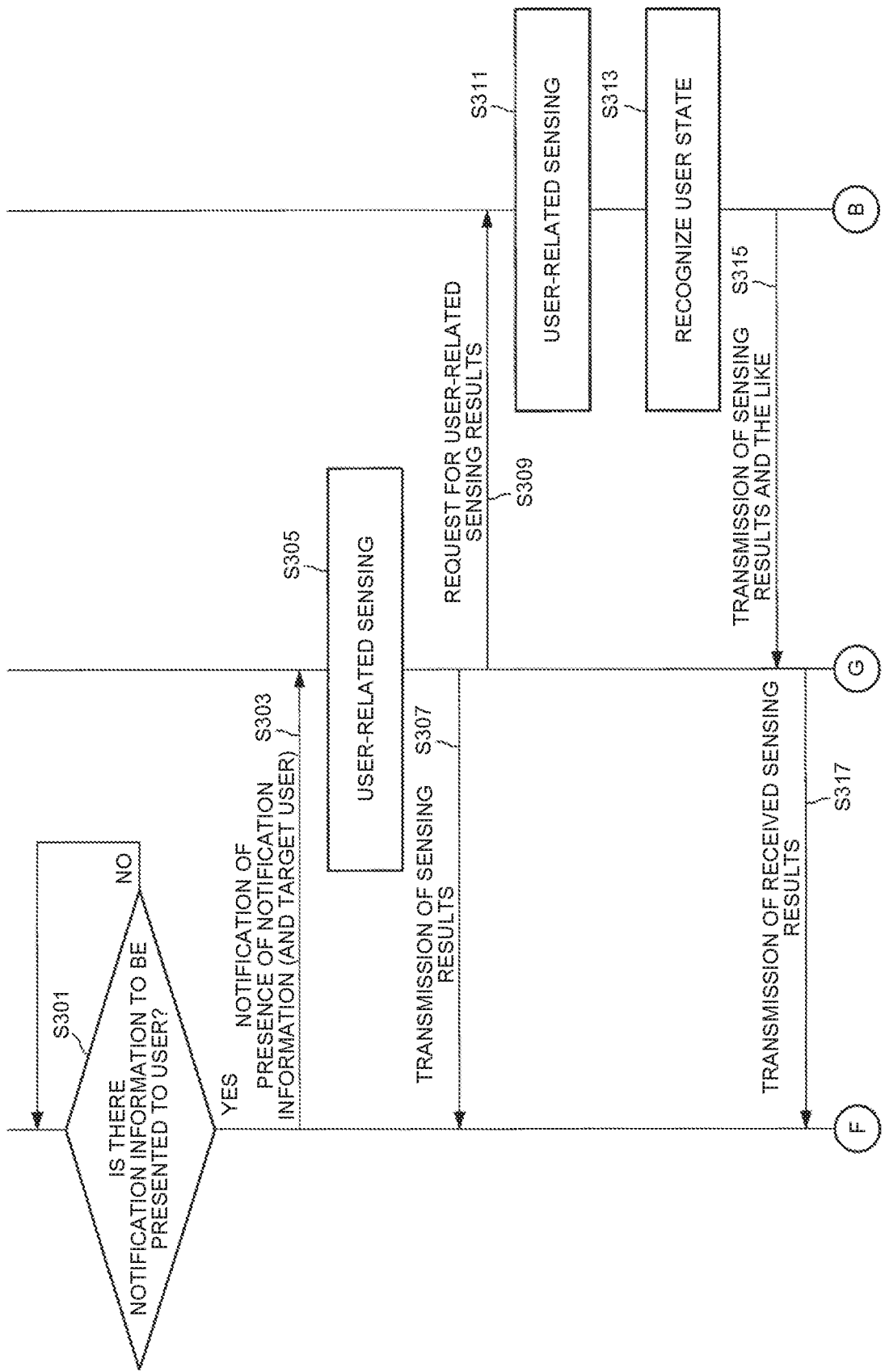
FIG. 27 is a sequence diagram illustrating a portion of the process flow according to the second embodiment.

FIG. 27 is a sequence diagram illustrating a portion of the process flow according to the second embodiment. As illustrated in FIG. 27, the control unit 700 of server 70 first confirms the presence or absence of notification information that is to be reported to the user within a predetermined time period (S301). While there is no notification information that is to be reported within the predetermined time period (S301: No), the control unit 700 repeats the processing of S301.

On the other hand, if notification information that is to be reported within the predetermined time period is present (S301: Yes), the communication unit 720 transmits information indicating the presence of the notification information to terminal 10 under the control of the transmission control unit 708. Here, the information indicating the presence of the notification information may include identification information for a user who is a notification target, for example (S303).

Thereafter, the terminal 10 performs sensing with respect to the user (S305). The terminal 10 then transmits the sensing results to the server 70 (S307).

Note that the processing of S309 to S315 illustrated in FIG. 27 is the same as S105 to S111 according to the first embodiment (illustrated in FIG. 14).

After S315, the terminal 10 transmits, to the server 70, sensing results and the like received from all the devices 20, for example, in S315 (S317).

Figure 28:
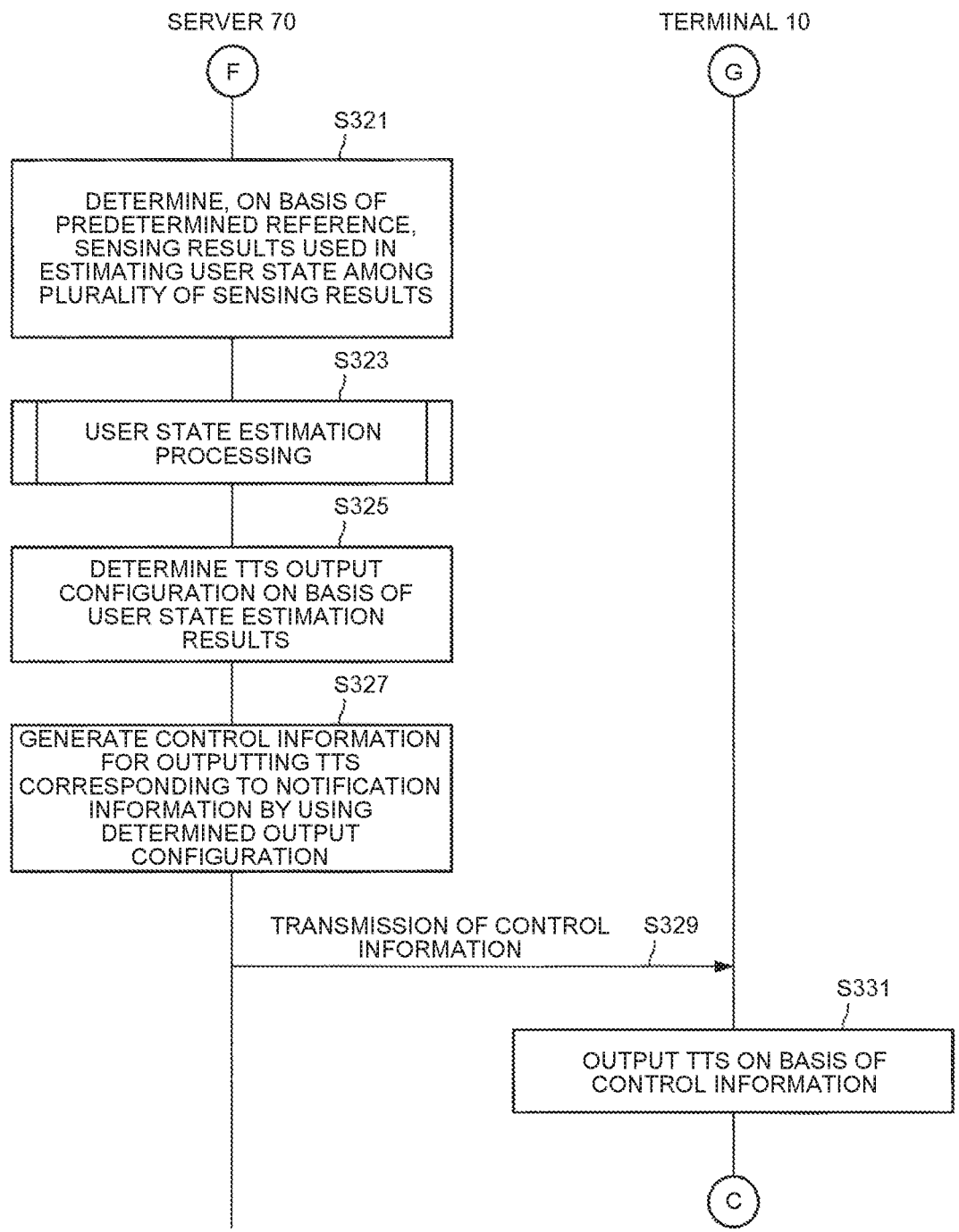
FIG. 28 is a sequence diagram illustrating a portion of the process flow according to the second embodiment.

Here, the process flow after S317 will be described with reference to FIG. 28. As illustrated in FIG. 28, after S317, the determination unit 702 of server 70 determines, on the basis of a predetermined reference, one or more selected sensing results used in estimating a user state from among the sensing results from the terminal 10 received in S307 and the sensing results from each device 20 received in S317 (S321).

Next, the user state estimation unit 704 of server 70 performs "user state estimation processing" (S323). Note that the content of the processing of S323 may be substantially the same as the processing of S123 according to the first embodiment illustrated in FIGS. 17 to 19.

Thereafter, the output control unit 706 of server 70 determines, on the basis of the user state estimated in S323, an output configuration for speech that corresponds to the notification information acquired in S301 (S325).

Thereafter, the output control unit 706 generates control information for outputting, by means of the output configuration determined in S325, speech that corresponds to the notification information (S327). The communication unit 720 then transmits the control information generated in S327 to terminal 10 under the control of the output control unit 706 (S329).

Thereafter, the output control unit 106 of terminal 10 causes the output unit 124 to output speech that corresponds to the notification information according to the control information received in S329 (S331).

Note that the processing after S331 is substantially the same as S141 to S147 according to the first embodiment (illustrated in FIG. 16).

2-5. Advantageous Effects

As described hereinabove, the server 70 according to the second embodiment determines, on the basis of the predetermined reference, one or more selected sensing results used in estimating a user state from among a plurality of sensing results received via the terminal 10 from a plurality of devices 20 in space 4, and causes the terminal 10 to output information on the basis of the one or more selected sensing results. Thus, substantially the same advantageous effects as in the first embodiment described in "Sections 1 to 6" are obtained.

2-6. Modification Example

2-6-1. Modification Example 1

The second embodiment is not limited to the foregoing example. For example, although there is only a single server 70 illustrated in FIG. 24, the second embodiment is not limited to this example, rather, the functions of the server 70 may be realized as a result of a plurality of computers operating cooperatively.

2-6-2. Modification Example 2

As another modification example, another apparatus that has the same functions as the foregoing control unit 700 and is capable of communicating with the terminal 10 via the communications network 22, for example, may control information outputs to the terminal 10 instead of the server 70. In other words, the other apparatus may determine the one or more selected sensing results and cause the terminal 10 to output information on the basis of the one or more selected sensing results. By way of an example, the other apparatus may be a general-purpose PC, a tablet-type terminal, a game console, a mobile phone such as a smartphone, a portable music player, a loudspeaker, a projector, a wearable device (for example, eyewear, a smartwatch, or the like), an in-vehicle apparatus (a car navigation apparatus, or the like), or a robot (for example, a humanoid robot, a drone, or the like). In addition, in this case, the server 70 need not necessarily be installed.

3. Hardware Configuration

A hardware configuration example of the terminal 10 which is common to each embodiment will be described next with reference to FIG. 29. As illustrated in FIG. 29, the terminal 10 is provided with a CPU 150, a Read Only Memory (ROM) 152, a Random Access Memory (RAM) 154, a bus 156, an interface 158, an input apparatus 160, an output apparatus 162, the storage apparatus 164, and the communication apparatus 166.

The CPU 150 functions as an arithmetic processing unit and as a control apparatus and controls overall operations in the terminal 10 according to various programs. Furthermore, the CPU 150 implements the functions of the control unit 100 in the terminal 10. Note that the CPU 150 is configured from a processor such as a microprocessor.

The ROM 152 stores programs used by the CPU 150, control data such as arithmetic parameters, and the like.

The RAM 154 temporarily stores the programs executed by the CPU 150 and data in use, and the like, for example.

The bus 156 is configured from a CPU bus or the like. The bus 156 interconnects the CPU 150, ROM 152, and RAM 154.

The interface 158 connects the input apparatus 160, output apparatus 162, storage apparatus 164, and communication apparatus 166 to the bus 156.

The input apparatus 160 is configured from inputting means with which the user inputs information, such as a touch panel, a button, a switch, a lever, or a microphone, for example, and an input control circuit that generates an input signal on the basis of the user inputs and outputs the input signal to the CPU 150, and the like, for example.

The output apparatus 162 includes a display apparatus such as an LCD or OLED display or the like, or a projector, for example. Furthermore, the output apparatus 162 includes a speech output apparatus such as a loudspeaker.

The storage apparatus 164 is an apparatus for data storage that functions as the storage unit 126. The storage apparatus 164 includes, for example, a storage medium, a recording apparatus for recording data on the storage medium, a reading apparatus for reading data from the storage medium, and a deletion apparatus for deleting data recorded on the storage medium, or the like.

The communication apparatus 166 is a communication interface configured from a communication device (a network card or the like, for example) for a connection to the communications network 22, and the like, for example. Furthermore, the communication apparatus 166 may be a wireless LAN-compatible communication apparatus, a Long-Term Evolution (LTE)-compatible communication apparatus, or a wire communication apparatus for performing communications over a wire. The communication apparatus 166 functions as a communication unit 120.

4. Modification Example

Preferred embodiments of the present disclosure have been described in detail hereinabove with reference to the accompanying drawings, but the present disclosure is not limited to or by such examples. It is obvious that a person ordinarily skilled in the technical field to which the present disclosure belongs could arrive at various modification examples or revised examples within the scope of the technological ideas disclosed in the claims, and it is naturally understood that such examples belong to the technical scope of the present disclosure.

4-1. Modification Example 1

For example, in terms of outputting notification information to the user, if a plurality of users are present in space 4, the terminal 10 (or server 70) may determine, on the basis of the predetermined reference and as the one or more selected sensing results, sensing results which are used in estimating only the state of a user who is a notification target for the notification information, from among a plurality of sensing results received from a plurality of devices 20 in space 4. For example, a facial image of each user in space 4 may be pre-registered in the terminal 10 (or server 70). The terminal (or server 70) may then select, from among the plurality of sensing results, the sensing results that correspond to the notification target user by comparing captured images of the faces of one or more users captured by a plurality of devices 20, from among a plurality of users in space 4, with pre-registered facial images of the notification target user.

In addition, the terminal 10 (or server 70) may estimate only the state of the notification target user on the basis of the one or more selected sensing results thus determined and may cause the output unit 124 to output the notification information on the basis of the estimation result.

4-2. Modification Example 2

Each of the steps in the process flows of the foregoing embodiments need not necessarily be processed in order of appearance. For example, each of the steps may be processed by revising the order as appropriate. Moreover, a portion of each of the steps may be processed in parallel or individually instead of being processed chronologically. In addition, a portion of the disclosed steps may be omitted, or other steps may be added.

Moreover, by means of each of the foregoing embodiments, a computer program, for causing hardware such as the CPU 150, ROM 152 and RAM 154 to exhibit functions which are identical to each of the configurations of the terminal 10 according to the first embodiment and/or the server 70 according to the second embodiment, can also be provided. Further, a storage medium whereon the computer program is recorded may also be provided.

Furthermore, the advantageous effects disclosed in the present specification are only descriptive or exemplary, and non-limiting. In other words, the technology according to the present disclosure affords, in addition to or instead of the foregoing advantageous effects, other advantageous effects which are obvious, based on the disclosure of the present specification, to a person skilled in the art.

Note that the following configurations also fall within the technical scope of the present invention.

(1)
An information processing apparatus, comprising:
a determination unit that determines, on the basis of a predetermined reference, one or more second sensing results used in estimating a user state from among a plurality of first sensing results received from a plurality of devices; and
an output control unit that controls an output of information on the basis of the one or more second sensing results.

(2)
The information processing apparatus according to (1), wherein the output control unit controls the output of the information on the basis of the user state estimated using the one or more second sensing results.

(3)
The information processing apparatus according to (2),
wherein the one or more second sensing results include sensing results for each of a plurality of sensing types, and
wherein, for each of the plurality of sensing types, the determination unit determines the one or more second sensing results by selecting, on the basis of the predetermined reference, the sensing results that correspond to the sensing type, respectively, from among the plurality of first sensing results.

(4)
The information processing apparatus according to (3), wherein the predetermined reference includes at least one of a distance between each of the plurality of devices and the user, performance information of each of the plurality of devices, a manufacturing-source reliability level of each of the plurality of devices, and a user evaluation grade associated with each of the plurality of devices.

(5)
The information processing apparatus according to (4), wherein, for each of the plurality of sensing types, the determination unit selects, from among the plurality of first sensing results, the sensing results that correspond to the sensing type of the device located closer to the user, respectively, among the plurality of devices.

(6)
The information processing apparatus according to (5), wherein, for each of the plurality of sensing types, the determination unit selects, from among the plurality of first sensing results, the sensing results that correspond to the sensing type of the device having a superior sensing performance for the sensing type, respectively, among the plurality of devices.

(7)
The information processing apparatus according to (5) or (6), wherein, for each of the plurality of sensing types, the determination unit selects, from among the plurality of first sensing results, the sensing results that correspond to the sensing type of the device having a superior manufacturing-source reliability level, respectively, among the plurality of devices.

(8)
The information processing apparatus according to any one of (5) to (7), wherein, for each of the plurality of sensing types, the determination unit selects, from among the plurality of first sensing results, the sensing results that correspond to the sensing type of the device having a superior user evaluation grade stored in association with each of the plurality of devices.

(9)
The information processing apparatus according to any one of (4) to (8), wherein, for each of the plurality of sensing types, the determination unit determines the one or more second sensing results by selecting the sensing results that correspond to the sensing type, respectively, from among the plurality of first sensing results, on the basis of a distance between each of the plurality of devices and the user, performance information of each of the plurality of devices, a manufacturing-source reliability level of each of the plurality of devices, and a user evaluation grade associated with each of the plurality of devices.

(10)
The information processing apparatus according to any one of (4) to (9),
wherein the plurality of sensing types include sensing of sound, and
wherein the determination unit determines the one or more second sensing results by prioritizing selection, from among the plurality of first sensing results, of sensing results for which a user utterance sound is sensed as a direct sound over selection of sensing results for which the user utterance sound is sensed as an indirect sound.

(11)
The information processing apparatus according to any one of (4) to (10), wherein the output control unit causes an output unit to output the information in an output form that corresponds to the user state estimated using the one or more second sensing results.

(12)
The information processing apparatus according to (11),
wherein the information is notification information for the user, and
wherein the output control unit causes the output unit to output speech that corresponds to the notification information for the user in an output form that corresponds to the user state estimated using the one or more second sensing results.

(13)
The information processing apparatus according to (12),
wherein the output control unit determines notification timing for the notification information for the user on the basis of the user state estimated using the one or more second sensing results and
causes the output unit to output speech that corresponds to the notification information for the user, with the determined notification timing.

(14)

The information processing apparatus according to any one of (11) to (13), further comprising: a storage unit that stores, in association with the device that has sensed each of the one or more second sensing results, information which indicates the evaluation grade obtained from the user with respect to an output of the information after the information has been output by the output unit.

(15)

The information processing apparatus according to any one of (11) to (14), further comprising: a transmission control unit that causes a communication unit to transmit, to the device that has sensed each of the one or more second sensing results, information which indicates the evaluation grade obtained from the user with respect to an output of the information after the information has been output by the output unit.

(16)

The information processing apparatus according to (15), further comprising:
the communication unit; and
a user state estimation unit that estimates the user state by using the one or more second sensing results,
wherein the communication unit receives the plurality of first sensing results from the plurality of devices.

(17)

The information processing apparatus according to any one of (11) to (16), further comprising:
a sensor unit that performs sensing with respect to each of one or more of the plurality of sensing types,
wherein, for each of the plurality of sensing types, the determination unit determines the one or more second sensing results by selecting, on the basis of the predetermined reference, the sensing results relating to the user and that correspond to the sensing type, respectively, from among the plurality of first sensing results and the sensing results from the sensor unit.

(18)

The information processing apparatus according to (17), wherein, for each of the plurality of sensing types, if it is determined that the user-related sensing that corresponds to the sensing type by the sensor unit is impossible or if the accuracy of the user-related sensing results that correspond to the sensing type by the sensor unit is lower than a predetermined threshold value, the determination unit selects, on the basis of the predetermined reference, sensing results that correspond to the sensing type, respectively, from among the plurality of first sensing results.

(19)

An information processing method, comprising:
determining, on the basis of a predetermined reference, one or more second sensing results used in estimating a user state from among a plurality of first sensing results received from a plurality of devices; and
controlling, by a processor, an output of information on the basis of the one or more second sensing results.

(20)

A program for causing a computer to function as:
a determination unit that determines, on the basis of a predetermined reference, one or more second sensing results used in estimating a user state from among a plurality of first sensing results received from a plurality of devices; and
an output control unit that controls an output of information on the basis of the one or more second sensing results.

REFERENCE SIGNS LIST

10 TERMINAL
20 DEVICE
22 COMMUNICATIONS NETWORK
70 SERVER
100, 200, 700 CONTROL UNIT
102, 702 DETERMINATION UNIT
104, 704 USER STATE ESTIMATION UNIT
106, 706 OUTPUT CONTROL UNIT
108, 708 TRANSMISSION CONTROL UNIT
120, 220, 720 COMMUNICATION UNIT
122, 222 SENSOR UNIT
124 OUTPUT UNIT
126, 224, 722 STORAGE UNIT

The invention claimed is:

1. An information processing apparatus, comprising:
one or more sensors having a sensing range and configured to acquire first sensing results related to a user based on a presence of the user within the sensing range;
one or more processors configured to:
transmit a sensing result provision request to a plurality of devices that are located in a predetermined space, in response to the user being outside the sensing range of the one or more sensors, to acquire a plurality of second sensing results related to the user;
receive, from the plurality of devices, the plurality of second sensing results based on the sensing result provision request;
select, based on a predetermined reference, one or more third sensing results from among the received plurality of second sensing results, wherein the predetermined reference is a combination of a plurality of types of references, and wherein the one or more third sensing results are selected based on the combination of the plurality of the types of references and a priority level associated with each of the plurality of the types of references;
estimate, based on the predetermined reference and the one or more third sensing results, a user state as one of a plurality of predetermined states, wherein the plurality of predetermined states includes a state to emphasize notification information, a state to deliver the notification information after a predetermined time, and a state to deliver the notification information in a normal configuration to the user; and
control an output of the notification information based on the estimated user state.

2. The information processing apparatus according to claim 1,
wherein the one or more third sensing results include sensing results for each of a plurality of sensing types, and
wherein, for each of the plurality of sensing types, the one or more processors select, based on the predetermined reference, the one or more third sensing results that correspond to a sensing type, respectively, from among the plurality of second sensing results.

3. The information processing apparatus according to claim 2, wherein the predetermined reference includes at least one of a distance between each of the plurality of devices and the user, performance information of each of the plurality of devices, a manufacturing-source reliability level of each of the plurality of devices, and a user evaluation grade associated with each of the plurality of devices, wherein the user evaluation grade corresponds to sensed feedback of the user for another information outputted in past.

4. The information processing apparatus according to claim 3, wherein, for each of the plurality of sensing types, the one or more processors select, from among the plurality of second sensing results, the one or more third sensing results that correspond to a sensing type of a device located closer to the user, respectively, among the plurality of devices.

5. The information processing apparatus according to claim 3, wherein, for each of the plurality of sensing types, the one or more processors select, from among the plurality of second sensing results, the one or more third sensing results that correspond to a sensing type of a device having a superior sensing performance for the sensing type, respectively, among the plurality of devices.

6. The information processing apparatus according to claim 3, wherein, for each of the plurality of sensing types, the one or more processors select, from among the plurality of second sensing results, the one or more third sensing results that correspond to a sensing type of a device having a superior manufacturing-source reliability level, respectively, among the plurality of devices.

7. The information processing apparatus according to claim 3, wherein, for each of the plurality of sensing types, the one or more processors select, from among the plurality of second sensing results, the one or more third sensing results that correspond to a sensing type of a device having a superior user evaluation grade, respectively, from among the plurality of devices.

8. The information processing apparatus according to claim 3, wherein, for each of the plurality of sensing types, the one or more processors select the one or more third sensing results that correspond to a sensing type, respectively, from among the plurality of second sensing results, based on the distance between each of the plurality of devices and the user, the performance information of each of the plurality of devices, the manufacturing-source reliability level of each of the plurality of devices, and the user evaluation grade associated with each of the plurality of devices, and
wherein the distance between each of the plurality of devices and the user, the performance information of each of the plurality of devices, the manufacturing-source reliability level of each of the plurality of devices, and the user evaluation grade associated with each of the plurality of devices have different priority levels based on which the one or more third sensing results are selected from among the received plurality of second sensing results.

9. The information processing apparatus according to claim 3,
wherein the plurality of sensing types include sensing of sound, and
wherein the one or more processors select the one or more third sensing results, from among the plurality of second sensing results, by prioritization of sensing results for which a user utterance sound is sensed as a direct sound over sensing results for which the user utterance sound is sensed as an indirect sound.

10. The information processing apparatus according to claim 3, wherein the one or more processors are further configured to output the notification information in an output form that corresponds to the user state estimated based on the one or more third sensing results.

11. The information processing apparatus according to claim 10,
wherein the one or more processors output a speech that corresponds to the notification information for the user in the output form that corresponds to the user state estimated based on the one or more third sensing results.

12. The information processing apparatus according to claim 11, wherein the one or more processors are further configured to:
determine a notification timing for the notification information for the user based on the user state that is estimated based on the one or more third sensing results; and
output speech that corresponds to the notification information for the user, with the determined notification timing.

13. The information processing apparatus according to claim 10,
wherein the one or more processors are further configured to store, in association with a device of the plurality of devices that has sensed each of the one or more third sensing results, information which indicates the user evaluation grade obtained from the user with respect to the output of the information after the notification information has been output by the one or more processors.

14. The information processing apparatus according to claim 10,
wherein the one or more processors are further configured to transmit, to a device of the plurality of devices that has sensed each of the one or more third sensing results, information which indicates the user evaluation grade obtained from the user with respect to the output of the information after the notification information has been output by the one or more processors.

15. The information processing apparatus according to claim 10,
wherein the one or more sensors are further configured to perform sensing with respect to each of one or more of the plurality of sensing types to acquire the first sensing results, and
wherein, for each of the plurality of sensing types, the one or more processors select, based on the predetermined reference, the one or more third sensing results relating to the user and that correspond to a sensing type, respectively, from among the plurality of second sensing results and the first sensing results from the one or more sensors.

16. The information processing apparatus according to claim 15, wherein, for each of the plurality of sensing types, if it is determined that an accuracy of the first sensing results that correspond to the sensing type by the one or more sensors is lower than a predetermined threshold value, the one or more processors select, based on the predetermined reference, the one or more third sensing results that correspond to the sensing type, respectively, from among the plurality of second sensing results.

17. An information processing method, comprising:
transmitting, by one or more processors of an information processing apparatus, a sensing result provision request to a plurality of devices that are located within a predetermined space, in response to a user being outside a sensing range of one or more sensors in the information processing apparatus, to acquire a plurality of second sensing results related to the user;

receiving, by the one or more processors, from the plurality of devices, the plurality of second sensing results based on the sensing result provision request;

selecting, by the one or more processors, based on a predetermined reference, one or more third sensing results used in estimating a user state from among the received plurality of second sensing results, wherein the predetermined reference is a combination of a plurality of types of references, and wherein the one or more third sensing results are selected based on the combination of the plurality of the types of references and a priority level associated with each of the plurality of the types of references;

estimating, by the one or more processors, based on the predetermined reference and the one or more third sensing results, a user state as one of a plurality of predetermined states, wherein the plurality of predetermined states includes a state to emphasize notification information, a state to deliver the notification information after a predetermined time, and a state to deliver the notification information in a normal configuration to the user; and controlling, by the one or more processors, an output of the notification information based on the estimated user state.

18. A non-transitory computer-readable medium, having stored thereon, computer-executable instructions that, when executed by a computer, cause the computer to execute operations, the operations comprising:

transmitting a sensing result provision request to a plurality of devices that are located within a predetermined space, in response to a user being outside a sensing range of one or more sensors, to acquire a plurality of second sensing results related to the user;

receiving, from the plurality of devices, the plurality of second sensing results based on the sensing result provision request;

selecting, based on a predetermined reference, one or more third sensing results used in estimating a user state from among the received plurality of second sensing results, wherein the predetermined reference is a combination of a plurality of types of references, and wherein the one or more third sensing results are selected based on the combination of the plurality of the types of references and a priority level associated with each of the plurality of the types of references;

estimating, based on the predetermined reference and the one or more third sensing results, a user state as one of a plurality of predetermined states, wherein the plurality of predetermined states includes a state to emphasize notification information, a state to deliver the notification information after a predetermined time, and a state to deliver the notification information in a normal configuration to the user; and controlling an output of the notification information based on the estimated user state.

* * * * *